(12) United States Patent
Teraoka

(10) Patent No.: US 8,508,865 B2
(45) Date of Patent: Aug. 13, 2013

(54) IMAGING LENS

(75) Inventor: Hiroyuki Teraoka, Kyoto (JP)

(73) Assignees: AAC Technologies Japan R&D Center, Kyoto (JP); AAC Acoustic Technologies (Shenzhen) Co., Ltd., Shenzhen (CN)

( * ) Notice: Subject to any disclaimer, the term of this patent is extended or adjusted under 35 U.S.C. 154(b) by 91 days.

(21) Appl. No.: 13/341,831

(22) Filed: Dec. 30, 2011

(65) Prior Publication Data

US 2012/0200944 A1    Aug. 9, 2012

(30) Foreign Application Priority Data

Feb. 7, 2011   (JP) .................................. 2011-024325

(51) Int. Cl.
*G02B 9/34*    (2006.01)
*G02B 13/18*   (2006.01)

(52) U.S. Cl.
USPC ......................................... 359/773; 359/715

(58) Field of Classification Search
USPC .......................................... 359/715, 753, 773
See application file for complete search history.

(56) References Cited

U.S. PATENT DOCUMENTS

2009/0009889 A1*   1/2009   Teraoka et al. ............... 359/773

* cited by examiner

*Primary Examiner* — William Choi
(74) *Attorney, Agent, or Firm* — Anova Law Group, PLLC

(57) ABSTRACT

An imaging lens includes, from an object-side to an image-side: an aperture stop, a first lens of positive refractive power with two convex surfaces along the optical axis of the imaging lens, a meniscus second lens of negative refractive power with a convex surface on the object-side, a meniscus third lens of positive refractive power with a convex surface on the image-side, a meniscus fourth lens of negative refractive power with a convex surface on the object-side. Specified conditions are satisfied in order to reduce aberrations and an Fno (focal ratio number) and enhance wide-angle view.

6 Claims, 25 Drawing Sheets

IMAGING LENS

BACKGROUND

1. Technical Field

The disclosure relates to imaging lenses and, particularly, to a compact imaging lens which has fourth lenses, a reduced total length, a wide-angle view and a high brightness.

2. Description of Related Art

In recent years, an image pickup element, such as a CCD (Charge Coupled Device) or a CMOS (Complementary-Metal Oxide Semiconductor) is widely used. In order to obtain small-sized camera modules for use in thin devices, such as mobile phones, personal digital assistant (PDA), or webcams that can still capture quality images, zoom lens systems with high zoom ratio but short overall length are desired.

Factors affecting both the zoom ratio and the overall length of the imaging lens, such as, the number and state of lenses employed, the power distribution of the employed lenses, and the shape of each employed lens, complicates any attempts at increasing zoom ratios but shortening overall lengths of imaging lenses. Additional, when the field of view of the lens is greater than 60°, a number of lens groups must be used to correct aberrations and ensure image quality, which will increase the overall length of the imaging lens. For example, reducing the number of lenses can shorten the overall length of the imaging lens, but zoom ratio and wide-angle view will suffer, conversely, increasing the number of lenses can increase zoom ratio and wide-angle view, but increases overall length of the imaging lens.

Therefore, the demand is high to develop an imaging lens with a short overall length and an reliable optical performance that matches with image sensing chips having enhanced resolution.

DETAILED DESCRIPTION

Embodiments of the disclosure will now be described in detail below, with reference to the accompanying drawings.

Figure 1:
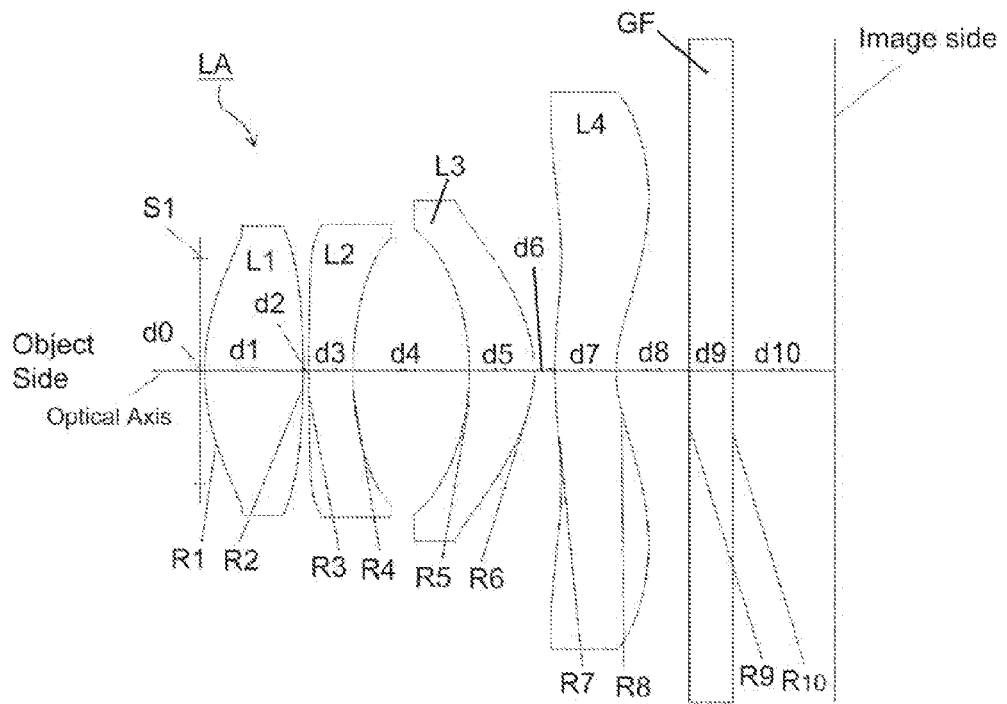
FIG. 1 is a schematic view of the imaging lens of the present invention.

Referring to FIG. 1, an imaging lens LA of the present invention, includes, in this order from the object-side to the image-side of the imaging lens LA, an aperture stop S1, a first lens L1 of positive refraction power, a meniscus second lens L2 of negative refraction power, a meniscus third lens L3 of positive refraction power, a meniscus fourth lens L4 of positive refraction power, a color filter GF, and an image plane IMG. The aperture stop S1 is positioned on the object-side surface the first lens L1. The color filter GF is positioned between the fourth lens L4 and the image plane IMG. The color filter GF can select from glass plate, or IR cut-off filter or low-pass filter. In other embodiments, the color filter GF can't be installed between the fourth lens L4 and the image plane IMG, but installed on other positions.

The first lens L1 has two convex surfaces along the optical axis of the imaging lens LA, the second lens L2 has a convex surface on the object-side, the third lens L3 has a convex surface on the image-side, and the fourth lens L4 has a convex surface on the object-side. In the present embodiment, in order to obtain a minimize overall length of the imaging lens LA, the four lenses are designed a telephoto type structure with position, negative, position and negative refractive power. Furthermore, in order to correct aberrations, all surfaces of the first, second, third lenses are aspherical surface.

The imaging lens LA satisfies the following condition formulas:

$$0.50 \leq f1/f \leq 0.75; \qquad (1)$$

$$5.20 \leq f/d1 \leq 8.00; \qquad (2)$$

$$12.00 \leq f/d6 \leq 45.00; \quad (3)$$

$$-0.35 \leq \leq R1/R2 \leq -0.20; \quad (4)$$

$$3.00 \leq R3/R4 \leq 20.00; \quad (5)$$

Wherein: f is a focal length of the imaging lens LA; f1 is a focal length of the first lens L1; d1 is a center thickness of the first lens L1 on the optical axis of the imaging lens LA; d6 is a distance between the image-side surface of the third lens L3 and the object-side surface of the fourth lens L4 on the optical axis of imaging lens LA; R1 is a radius of curvature of the object-side surface of the first lens L1; R2 is a radius of curvature of the image-side surface of the first lens L1; R3 is a radius of curvature of the object-side surface of the second lens L2; R4 is a radius of curvature of the image-side surface of the second lens L2.

The first condition (1) is configured for controlling the positive refraction power of the first lens L1. That is to say, when the ratio of the first condition (1) is smaller than the lower limit of the first condition (1), although it can effectively reduce the total length, the distortion is changed over a large range. By contraries, when ratio of the first condition (1) is greater than the upper limit of the first condition (1), the compact configuration is difficultly realized. So, when the ratio is met within the first condition (1), it not only can effectively reduce a total length of the imaging lens LA, but also can obtain low distortion, good imaging quality and a compact configuration.

The fourth condition (2) is configured for controlling the ratio that is the focal length of the imaging lens LA, and the center thickness of the first lens L1. When the ratio is under the lower limit of the condition (2), the distance LB between the image-side surface of the fourth lens L4 and the image plane IMG is difficult to control. By contraries, when the ratio is beyond the upper limit of the first condition (2), the thickness of the periphery of the first lens L1 is difficultly realized.

The fourth condition (3) is configured for controlling the ratio that is the focal length of the imaging lens LA, and the distance between the image-side surface of the third lens L3 and the object-side surface of the fourth lens L4. When the ratio is under the lower limit of the condition (3), although it can effectively reduce the total length of the imaging lens LA, the distortion is changed too bigger. By contraries, when the ratio is beyond the upper limit of the first condition (3), the short overall length of the imaging lens is difficultly realized.

The third condition (4) is configured for adjusting the shape of the first lens L1. When it is not satisfied the condition (4), when the wide-angle is in 60°~70° range and FNo (focal ratio number)<2.6, it is difficult to correct the spherical aberration and the coma aberration in a short overall length of the imaging lens LA.

The third condition (5) is configured for adjusting the shape of the second lens L2. When it is not satisfied the condition (5), when the wide-angle is in 60° ~70° range and FNo (focal ratio number) is less than 2.6, it is difficult to control the refraction power of the second lens L2, and correct the coma aberration in a short overall length of the imaging lens LA.

To achieve the imaging lens LA with a short overall length and excellent optical performance, both the first lens L1 and the third lens L3 are positive refraction power. the imaging lens LA satisfies the following conditions:

$$1.00 \leq R5/R6 \leq 3.00; \quad (6)$$

$$-1.30 \leq f2/f \leq -0.95; \quad (7)$$

Wherein: R5 is a radius of curvature of the object-side surface of the third lens L3; R6 is a radius of curvature of the image-side surface of the third lens L3; f is a focal length of the imaging lens; f2 is a focal length of the second lens L2.

The sixth condition (6) is configured for adjusting the shape of the third lens L3. When it is not satisfied the sixth condition (6), when the wide-angle is in 60°~70° range and FNo (focal ratio number) is less than 2.6, it is difficult to control the refraction power of the third lens L3, and obtain a short overall length.

The seventh condition (7) is configured for controlling the negative refraction power of the second lens L2. When it is not satisfied the sixth condition (7), the negative refraction power of the second lens L2 is changed in a large range, which is difficult to correct the coma aberration.

In order to obtain a short overall length, both the first lens L1 and the third lens L3 are positive refraction powers. In the present embodiment, the positive refraction power of the third lens L3 is configured for controlling the positive refraction power of the first lens L1.

In order to obtain a good coma aberration, both the second lens L2 and the fourth lens L4 are negative refraction powers. In the present embodiment, the negative refraction power of the fourth lens L4 is configured for controlling the negative refraction power of the second lens L2.

In order to obtain low distortion, good imaging quality, the imaging lens LA satisfies the following conditions:

$$0.55 \leq f3/f \leq 0.80; \quad (8)$$

$$-1.00 \leq f4/f \leq -0.50. \quad (9)$$

Wherein f is a focal length of the imaging lens; f3 is a focal length of the third lens L3; f4 is a focal length of the fourth lens L4.

The eighth condition (8) is configured for controlling the positive refraction power of the third lens L3. When it is not satisfied the eighth condition (8), the positive refraction power of the third lens L3 is changed in a large range, which is difficult to correct the coma aberration.

The ninth condition (9) is configured for controlling the negative refraction power of the fourth lens L4. When it is not satisfied the ninth condition (9), the negative refraction power of the fourth lens L4 is changed in a large range, which is difficult to correct the coma aberration.

In the above conditions, though the overall length of the imaging lens LA is reduced, brightness of FNo (focal ratio number) is maintained less than 2.6, wide-angle view is maintained within 60°~70° range, aberrations of the imaging lens LA are maintained within an acceptable range. That is, the imaging lens LA keeps chromatic aberrations at a minimum while reducing the total length of the imaging lens LA.

The first, second, third, and fourth lenses L1, L2, L3, L4 are made of glass or resin. When using of glass manufacturing the lens, it is preferred to select the glass that the transfer temperature below 400 degrees to improve the durability of the lens.

The resin can efficiently manufacture the lens with complicated configuration relative to the glass. When the resin used to manufacture the lens, it can select the resin according to the ASTMD542 method for the determination of refractive index of d light in 1.500~1.670 range and wavelength in 450 nm ~600 nm range, and the light transmittance of 80% or more, the best in more than 85%, such as thermoplastic resin, thermosetting resin. Regardless of thermoplastic resin and thermosetting resin, the first, second, third, and fourth lenses L1, L2, L3, and L4 can be made of the same resin material or different materials. The material of the second lens L2 is different from that of the first lens L1. The manufacture method of the resin can select injection molding, compression molding or injection molding.

It is well known that the refractive index of the resin can be changed according to the different temperature. In order to suppress this changement, it is preferred to select the atomic resin with average particle size below 100 nm, best in 50 nm, such as silicon dioxide, acidification aluminum, acidification titanium as the manufacturing material of lens.

The first, second, third, and fourth lenses L1, L2, L3, L4 made of resin each define an edge portion at the periphery thereof, the shape of the edge portion has no special requirement except do not affect the optical performance of the lenses. It is viewed from the forming process of the lens, the thickness of the edge portion is preferably within the thickness of 70%~130% range of the periphery of the lens. The incident light onto the arch of the lens can cause ghosting and flash phenomenon. In this case, it can arrange emitter masks between the lenses to prevent incident light onto the arch according to what's needed.

Before the imaging lens LA is used in the lens modules, each surface of the lenses L1, L2, L3 can be coated a film such as anti-reflective film, an IR film or a surface hardening process. The lens modules with the imaging lens LA can be used in components such as digital cameras, WEB cameras, computers, cars.

Example diagrams of the imaging lens LA will be described below with reference to FIGS. 1-48B. It is to be understood that the disclosure is not limited to these examples. The following are symbols used in each exemplary embodiment.

f: the focal length of the imaging lens;
f1: the focal length of the first lens;
f2: the focal length of the second lens;
f3: the focal length of the third lens;
f4: the focal length of the fourth lens;
FNo: focal ratio number;
2ω: field angle;
S1: aperture stop;
R: curvature radius of each optical surface, it is referred to the center curvature radius of the imaging lens;
R1: curvature radius of the object-side surface of the first lens;
R2: curvature radius of the image-side surface of the first lens;
R3: curvature radius of the object-side surface of the second lens;
R4: curvature radius of the image-side surface of the second lens;
R5: curvature radius of the object-side surface of the third lens;
R6: curvature radius of the image-side surface of the third lens;
R7: curvature radius of the object-side surface of the fourth lens;
R8: curvature radius of the image-side surface of the fourth lens;
R9: curvature radius of the object-side surface of the color filter;
R10: curvature radius of the image-side surface of the color filter;
d: center thickness of each lens;
d0: distance between the aperture stop and the object-side surface of the first lens;
d1: center thickness of the first lens;
d2: distance between the image-side surface of the first lens and the object-side surface of the second lens;
d3: center thickness of the second lens;
d4: distance between the image-side surface of the second lens and the object-side surface of the third lens;
d5: center thickness of the third lens;
d6: distance between the image-side surface of the third lens and object-side surface of the fourth lens;
d7: center thickness of the fourth lens;
d8: distance between the image-side surface of the fourth lens and the object-side surface of the color filter;
d9: center thickness of the color filter;
d10: distance between the image-side surface of the color filter and the image plane;
nd: refractive index of d light (wavelength: 587.6 nm);
n1: refractive index of d light in the first lens;
n2: refractive index of d light in the second lens;
n3: refractive index of d light in the third lens;
n4: refractive index of d light in the fourth lens;
n5: refractive index of d light in the color filter;
vd: Abbe number of d light;
v1: Abbe number of the first lens;
v2: Abbe number of the second lens;
v3: Abbe number of the third lens;
v4: Abbe number of the fourth lens;
v5: Abbe number of the color filter;
TTL: distance between the object-side surface of the color filter and the image plane;
LB: distance between the image-side surface of the fourth lens and the image plane (including the thickness of the color filter);
IH: the height of the image.

Each surface of the first, second, third, and fourth lenses L1, L2, L3, L4 is aspherical surface. The aspherical surfaces are shaped according to the formula:

$$Y=(X^2/R)/[1+\{1-(K+1)(X^2/R^2)\}]+A4X^4+A6X^6+A8X^8+A10X^{10}+A12X^{12} \quad (10)$$

Wherein R is curvature radius on the optical axis of the imaging lens; k is conic constant; A4, A6, A8, A10, A12 all are aspheric constant; y is the optical axis of the light passing forward direction; x is an axis perpendicular to the optical axis. The aspheric surface of the lenses shaped according to the formula (10), but, not limited to shaped by the formula (10).

Tables 1-2 show a first specification of the first embodiment of the imaging lens LA.

TABLE 1

|  | R | d |  | nd |  | vd |  |
|---|---|---|---|---|---|---|---|
| S1 | ∞ | d0 = | 0.000 |  |  |  |  |
| R1 | 1.612 | d1 = | 0.584 | n1 | 1.544 | v1 | 56.1 |
| R2 | −6.718 | d2 = | 0.060 |  |  |  |  |
| R3 | 34.776 | d3 = | 0.330 | n2 | 1.640 | v2 | 23.4 |
| R4 | 2.369 | d4 = | 0.804 |  |  |  |  |
| R5 | −2.309 | d5 = | 0.586 | n3 | 1.544 | v3 | 56.1 |
| R6 | −0.845 | d6 = | 0.093 |  |  |  |  |
| R7 | 3.264 | d7 = | 0.403 | n4 | 1.544 | v4 | 56.1 |
| R8 | 0.858 | d8 = | 0.500 |  |  |  |  |
| R9 | ∞ | d9 = | 0.300 | n5 | 1.517 | v5 | 64.17 |
| R10 | ∞ | d10 = | 0.641 |  |  |  |  |

TABLE 2

| | conic constant | aspheric constant | | | | |
|---|---|---|---|---|---|---|
| | k | A4 | A6 | A8 | A10 | A12 |
| R1 | −8.7753E−01 | 2.3787E−03 | −2.0823E−03 | −3.2880E−02 | −1.4124E−02 | 0.0000E+00 |
| R2 | −2.6049E+02 | −4.5064E−02 | −1.1565E−01 | 1.9068E−01 | −7.3006E−02 | 0.0000E+00 |
| R3 | 0.0000E+00 | 8.4680E−02 | −3.1523E−01 | 5.0741E−01 | −1.7976E−01 | 0.0000E+00 |
| R4 | 4.6525E+00 | 2.9740E−02 | −1.3924E−01 | 1.5978E−01 | −4.2234E−02 | 0.0000E+00 |
| R5 | −1.1331E+00 | 2.3652E−02 | −1.2280E−01 | 1.1539E−01 | −7.3780E−02 | 2.6379E−02 |
| R6 | −3.9393E+00 | −1.2801E−01 | 3.1006E−02 | −3.6571E−03 | 2.0234E−02 | −4.7615E−03 |
| R7 | 5.1145E−01 | −2.0880E−01 | 6.7472E−02 | 5.9491E−03 | −8.0924E−03 | 1.2442E−03 |
| R8 | −6.0999E+00 | −1.2662E−01 | 5.1293E−02 | −1.6832E−02 | 3.4268E−03 | −3.3912E−04 |

Figure 2:
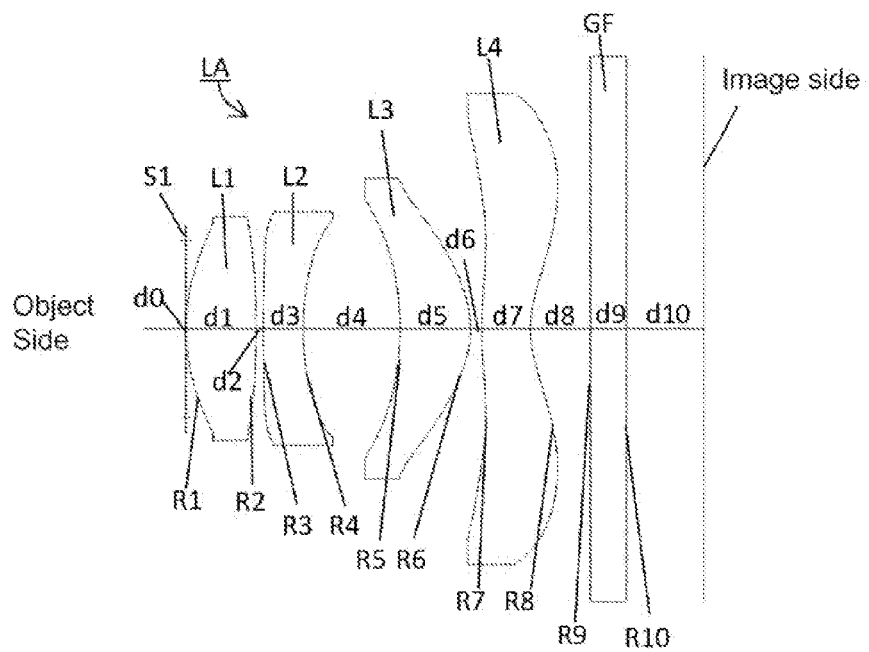
FIG. 2 is a schematic view of the imaging lens according to a first embodiment.
Figure 3:
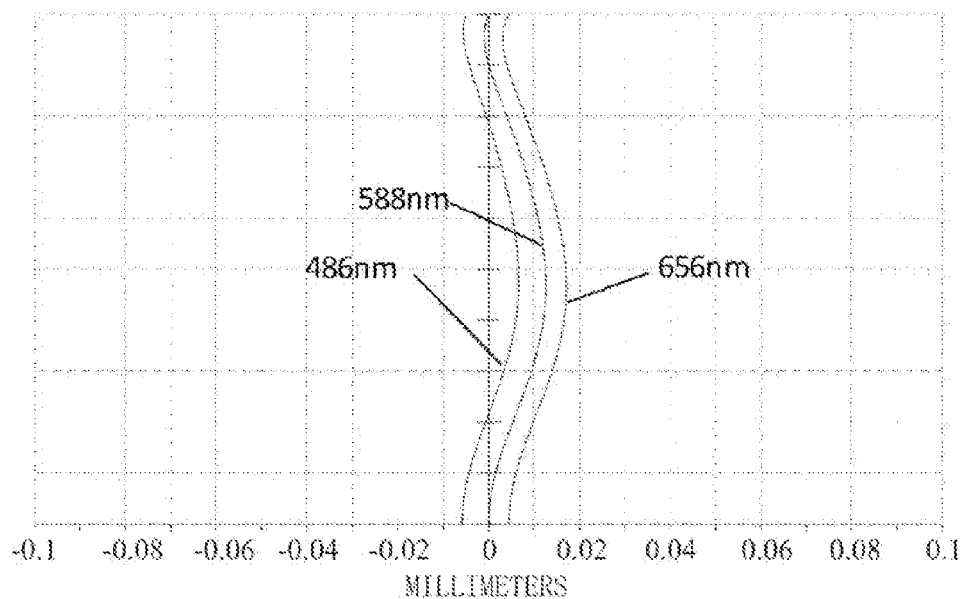
FIGS. 3~4, 5A, 5B are graphs respectively showing spherical aberration, lateral color aberration, astigmatism and distortion of FIG. 1.
Figure 4:
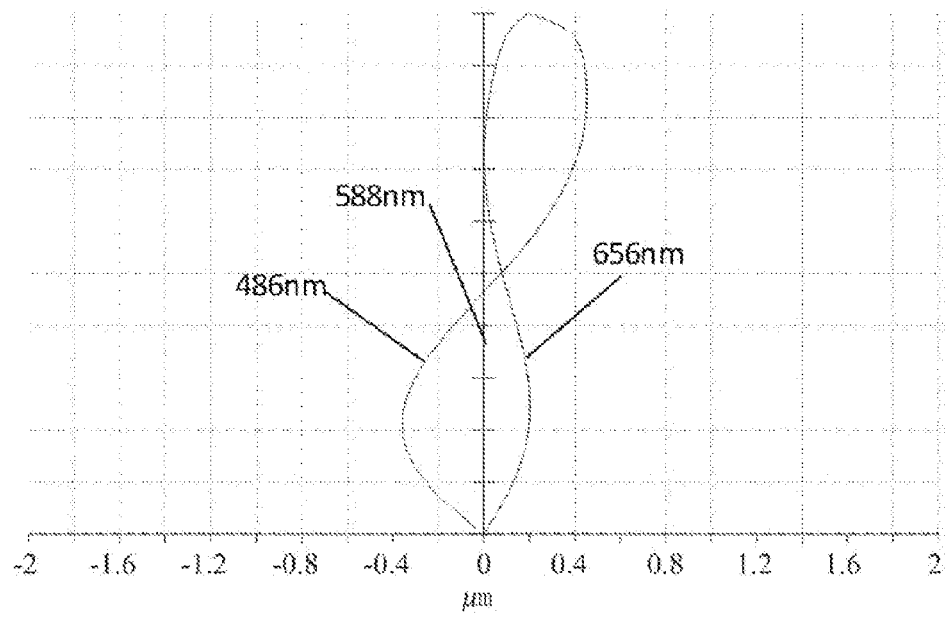
Figures 5A, 5B:
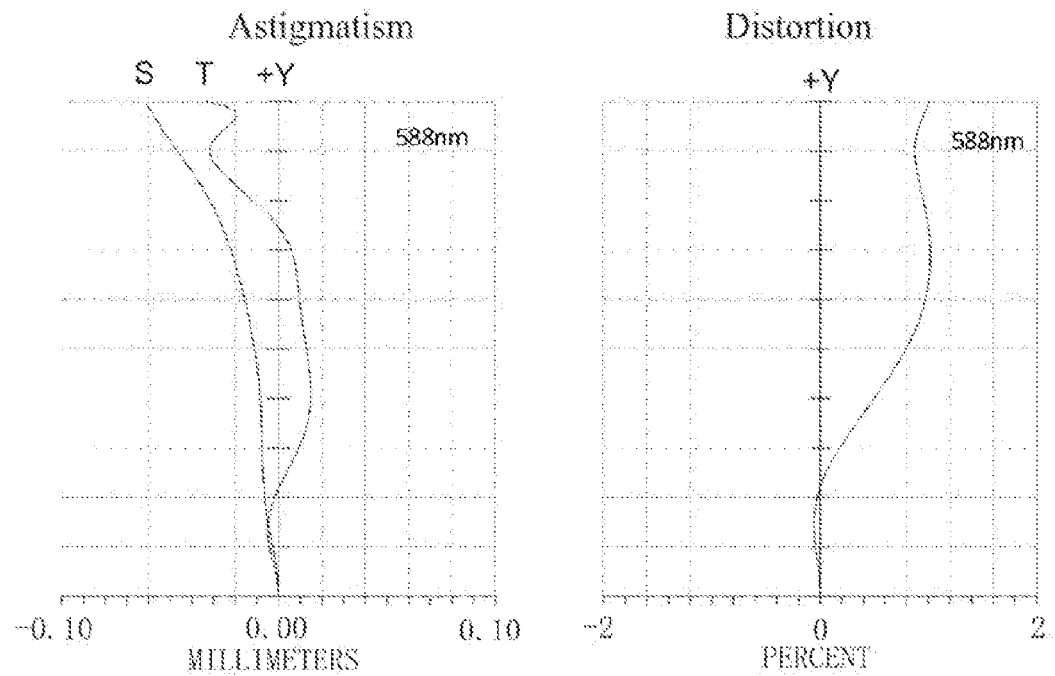

Referring to FIG. 2, an imaging lens LA according to a first embodiment is shown. FIGS. 3~4, 5A, 5B, are graphs of aberrations (spherical aberration, lateral color aberration, astigmatism, and distortion) of the first specification of the first embodiment of the imaging lens LA. In FIGS. 3 and 4, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the first specification of the exemplary embodiment is from −0.1 mm to 0.1 mm, the lateral color aberration of the first specification of the exemplary embodiment is from −2 mm to 2 mm. As illustrated in FIG. 5A, the astigmatism is shown at the d light (wavelength: 588 nm) for both the sagittal image surface S and the tangential image surface T. The astigmatism of the first specification of the exemplary embodiment of the imaging lens LA is from −0.10 mm to 0.10 mm. In FIG. 5B, the distortion of the first specification of the exemplary embodiment of the imaging lens LA is from −2% to 2%.

In the first specification, not only the overall length of the imaging lens LA is reduced and the brightness is ensured (seen in Table 25, 2ω=65.0°, TTL=4.301 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 3-4 show a second specification of the second embodiment of the imaging lens LA.

TABLE 3

| | R | d | | nd | | vd | |
|---|---|---|---|---|---|---|---|
| S1 | ∞ | d0 = | 0.000 | | | | |
| R1 | 1.605 | d1 = | 0.586 | n1 | 1.544 | v1 | 56.1 |
| R2 | −6.534 | d2 = | 0.051 | | | | |
| R3 | 38.164 | d3 = | 0.329 | n2 | 1.640 | v2 | 23.4 |
| R4 | 2.366 | d4 = | 0.821 | | | | |
| R5 | −2.277 | d5 = | 0.568 | n3 | 1.544 | v3 | 56.1 |
| R6 | −0.846 | d6 = | 0.085 | | | | |
| R7 | 3.636 | d7 = | 0.395 | n4 | 1.544 | v4 | 56.1 |
| R8 | 0.857 | d8 = | 0.500 | | | | |
| R9 | ∞ | d9 = | 0.300 | n5 | 1.517 | v5 | 64.17 |
| R10 | ∞ | d10 = | 0.745 | | | | |

TABLE 4

| | conic constant | aspheric constant | | | | |
|---|---|---|---|---|---|---|
| | k | A4 | A6 | A8 | A10 | A12 |
| R1 | −8.9033E−01 | 1.9453E−03 | −2.4431E−03 | −3.2967E−02 | −1.3737E−02 | 0.0000E+00 |
| R2 | −2.6636E+02 | −4.5824E−02 | −1.1583E−01 | 1.9050E−01 | −7.3373E−02 | 0.0000E+00 |
| R3 | 0.0000E+00 | 8.5633E−02 | −3.1474E−01 | 5.0782E−01 | −1.7919E−01 | 0.0000E+00 |
| R4 | 4.6495E+00 | 2.5198E−02 | −1.4030E−01 | 1.6078E−01 | −4.0582E−02 | 0.0000E+00 |
| R5 | −9.2180E−01 | 2.1463E−02 | −1.2391E−01 | 1.1371E−01 | −7.6085E−02 | 2.0673E−02 |
| R6 | −4.0477E+00 | −1.2639E−01 | 3.1258E−02 | −3.9581E−03 | 1.9245E−02 | −5.3830E−03 |
| R7 | 4.6006E−01 | −2.0905E−01 | 6.7416E−02 | 5.9291E−03 | −8.0997E−03 | 1.2411E−03 |
| R8 | −6.3958E+00 | −1.2650E−01 | 5.1304E−02 | −1.6833E−02 | 3.4249E−03 | −3.4017E−04 |

Figure 6:
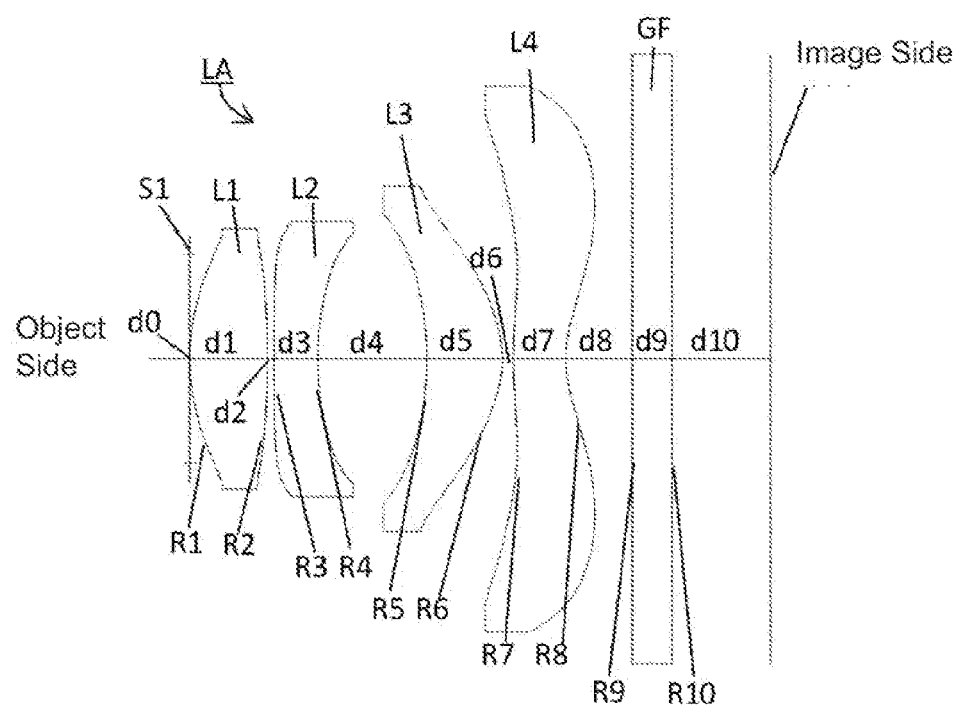
FIG. 6 is a schematic view of the imaging lens according to a second embodiment.
Figure 7:
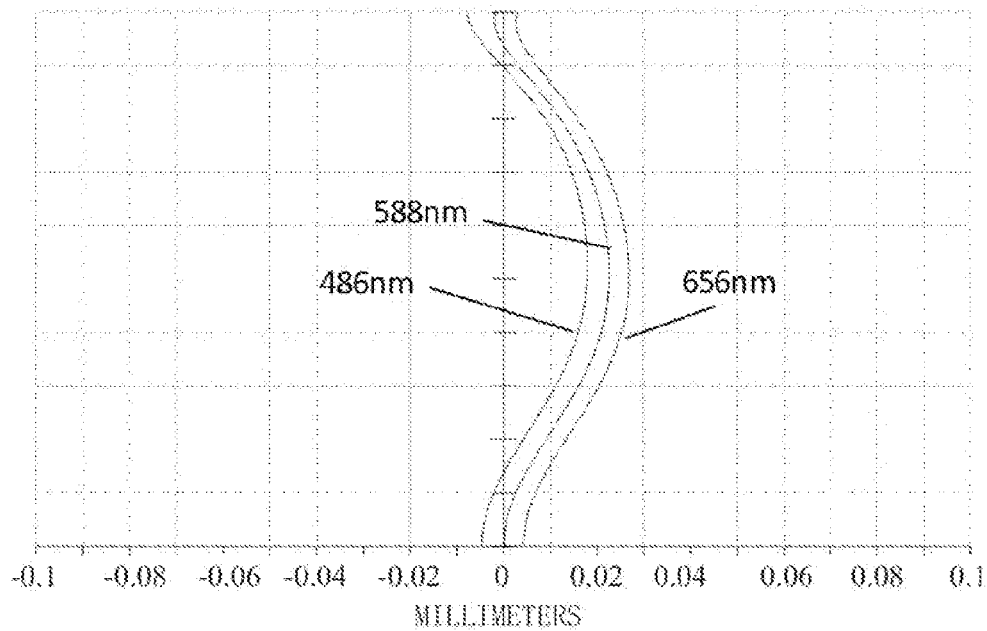
FIGS. 7~8, 9A, 9B are graphs respectively showing spherical aberration, lateral color aberration, astigmatism and distortion of FIG. 5.
Figure 8:
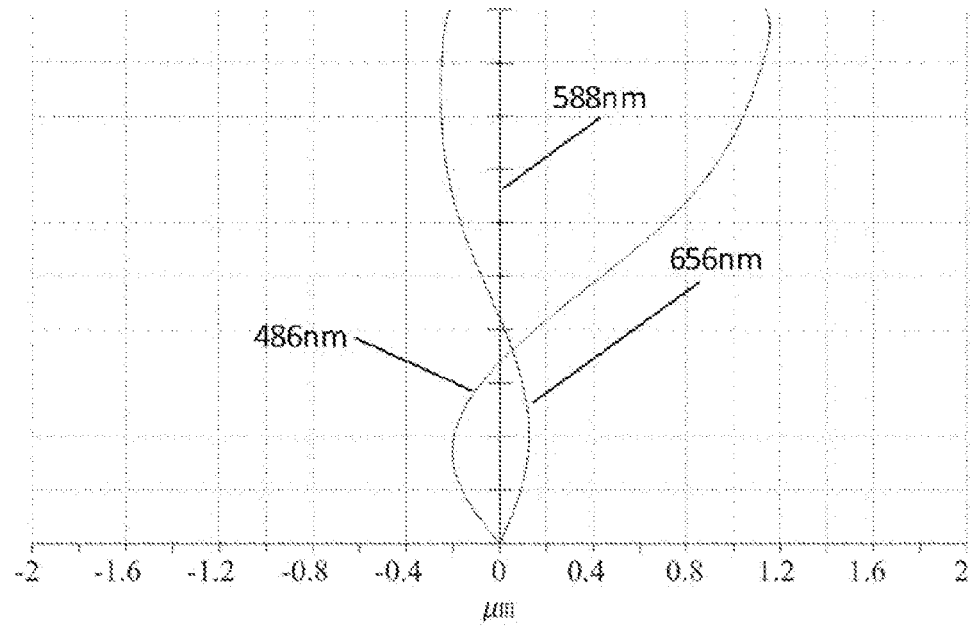
Figure 9A:
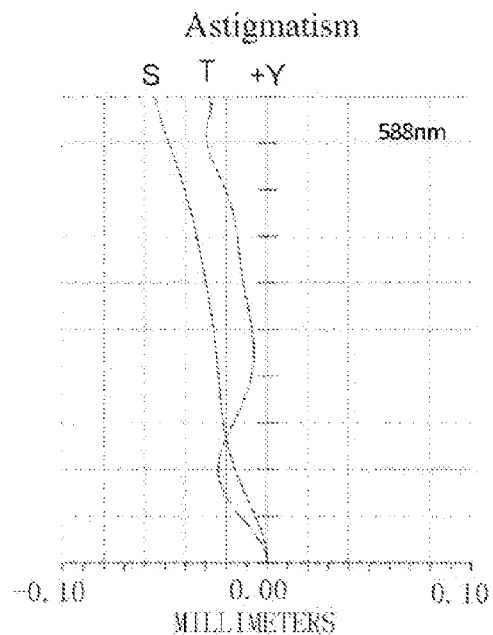
Figure 9B:
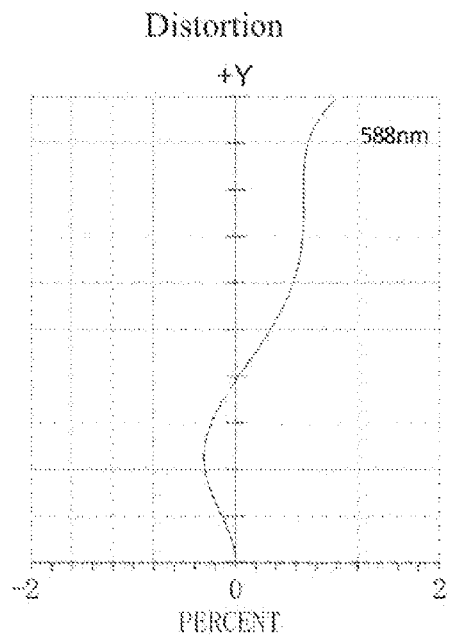

Referring to FIG. 6, an imaging lens LA according to a second embodiment is shown. FIGS. 7~8, 9A, 9B, are graphs of aberrations (spherical aberration, lateral color aberration, astigmatism, and distortion) of the second specification of the second embodiment of the imaging lens LA. In FIGS. 7 and 8, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the second specification of the second embodiment is from −0.1 mm to 0.1 mm, the lateral color aberration of the second specification of the second embodiment is from −2 mm to 2 mm. As illustrated in FIG. 9A, the astigmatism is shown at the d light (wavelength: 588 nm) for both the sagittal image surface S and the tangential image surface T. The astigmatism of the second specification of the second embodiment of the imaging lens LA is from −0.10 mm to 0.10 mm. In FIG. 9B, the distortion of the second specification of the second embodiment of the imaging lens LA is from −2% to 2%.

In the second specification, not only the overall length of the imaging lens LA is reduced and the brightness is ensured (seen in Table 25, 2ω=62.2°, TTL=4.380 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 5-6 show a third specification of the third embodiment of the imaging lens LA.

Figure 10:
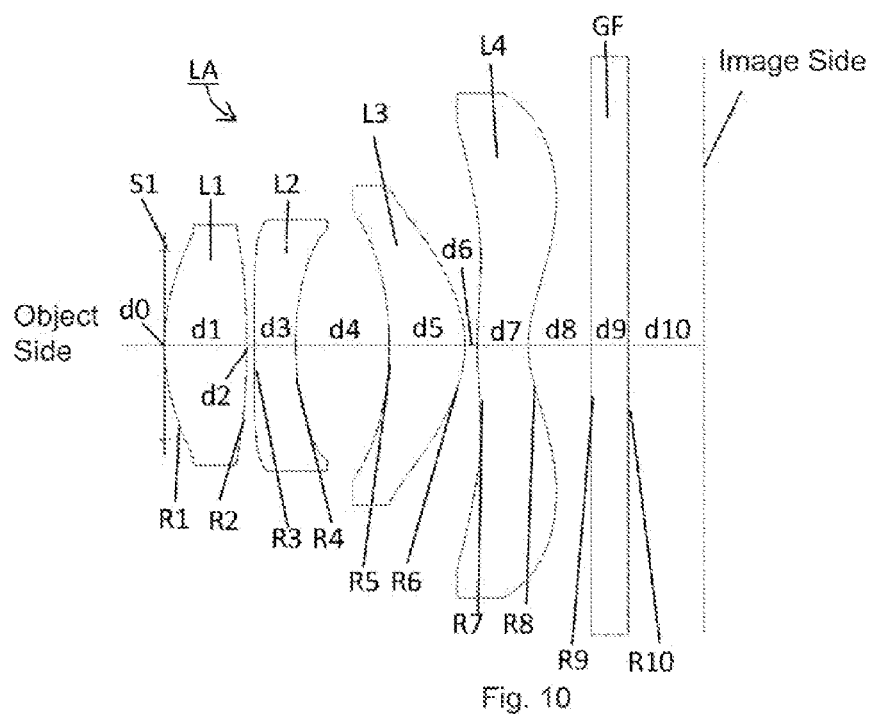
FIG. 10 is a schematic view of the imaging lens according to a third embodiment.
Figure 11:
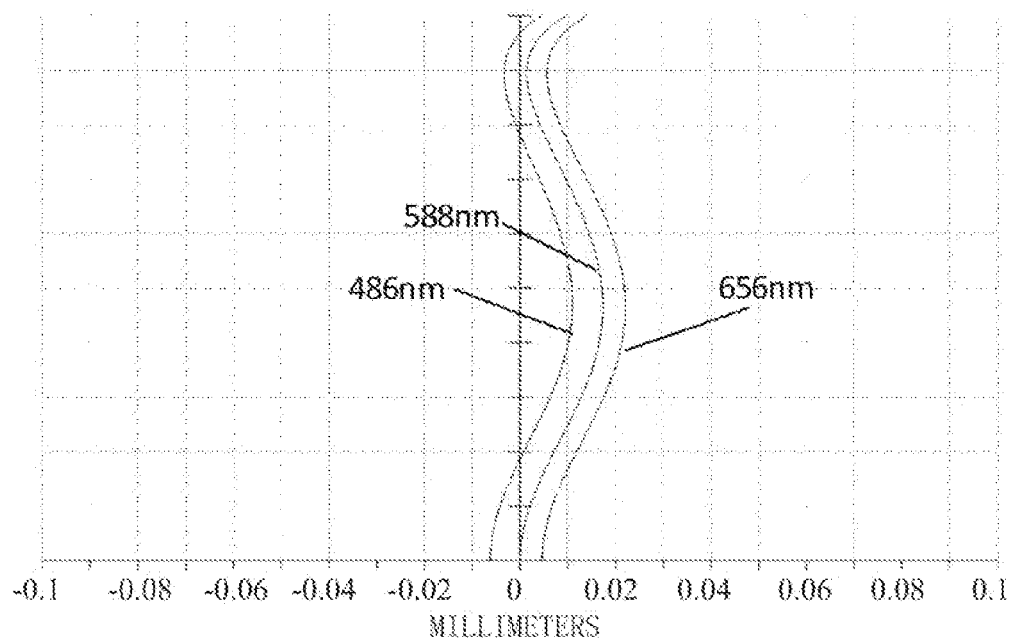
FIGS. 11~12, 13A, 13B are graphs respectively showing spherical aberration, lateral color aberration, astigmatism and distortion of FIG. 9.
Figure 12:
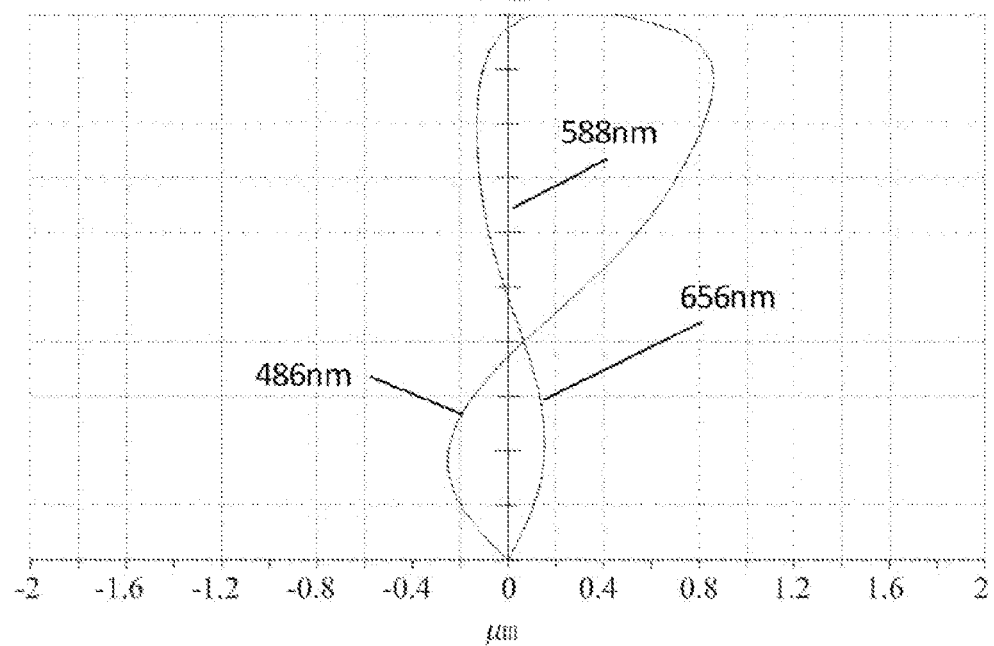
Figures 13A, 13B:
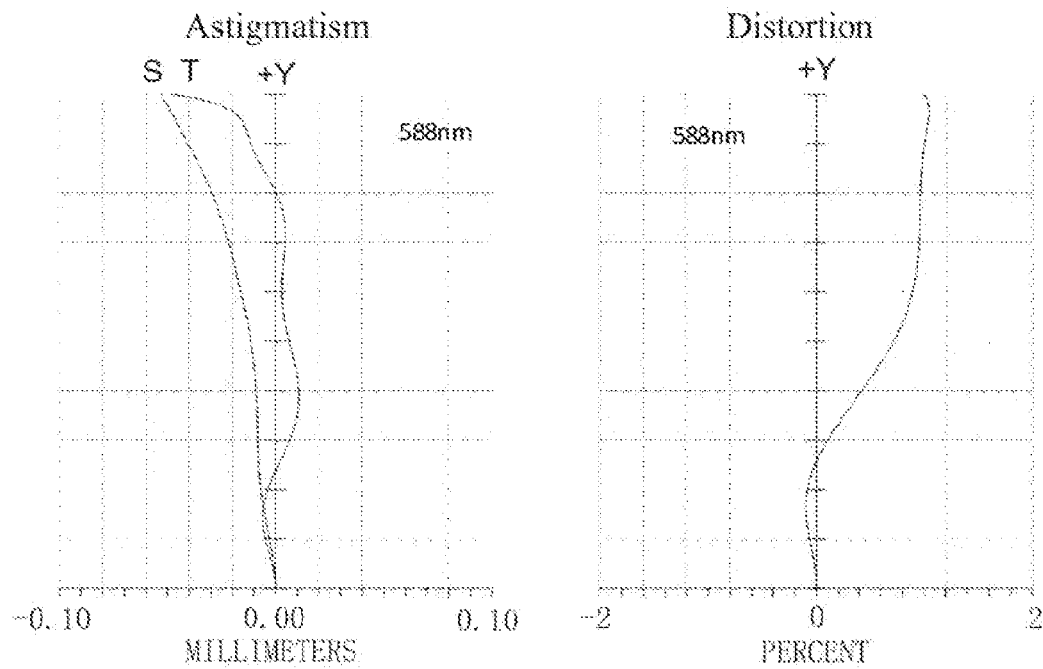

Referring to FIG. 10, an imaging lens LA according to a third embodiment is shown. FIGS. 11~12, 13A, 13B, are graphs of aberrations (spherical aberration, lateral color aberration, astigmatism, and distortion) of the third specification of the third embodiment of the imaging lens LA. In FIGS. 11 and 12, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the third specification of the exemplary embodiment is from −0.1 mm to 0.1 mm, the lateral color aberration of the third specification of the exemplary embodiment is from −2 mm to 2 mm. As illustrated in FIG. 13A, the astigmatism is shown at the d light (wavelength: 588 nm) for both the sagittal image surface S and the tangential image surface T. The astigmatism of the third specification of the exemplary embodiment of the imaging lens LA is from −0.10 mm to 0.10 mm. In FIG. 13B, the distortion of the third specification of the exemplary embodiment of the imaging lens LA is from −2% to 2%.

In the third specification, not only the overall length of the imaging lens LA is reduced and the brightness is ensured (seen in Table 25, 2ω=64.7°, TTL=4.308 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 7-8 show a fourth specification of the fourth embodiment of the imaging lens LA.

TABLE 5

|     | R       | d       |        | nd    |    | vd    |
| --- | ------- | ------- | ------ | ----- | -- | ----- |
| S1  | ∞       | d0 =    | 0.000  |       |    |       |
| R1  | 1.622   | d1 =    | 0.657  | n1 1.544 | v1 | 56.1 |
| R2  | −5.899  | d2 =    | 0.060  |       |    |       |
| R3  | 42.323  | d3 =    | 0.330  | n2 1.640 | v2 | 23.4 |
| R4  | 2.351   | d4 =    | 0.750  |       |    |       |
| R5  | −2.312  | d5 =    | 0.605  | n3 1.544 | v3 | 56.1 |
| R6  | −0.847  | d6 =    | 0.099  |       |    |       |
| R7  | 3.569   | d7 =    | 0.406  | n4 1.544 | v4 | 56.1 |
| R8  | 0.858   | d8 =    | 0.500  |       |    |       |
| R9  | ∞       | d9 =    | 0.300  | n5 1.517 | v5 | 64.17 |
| R10 | ∞       | d10 =   | 0.601  |       |    |       |

TABLE 7

|     | R       | d       |        | nd    |    | vd    |
| --- | ------- | ------- | ------ | ----- | -- | ----- |
| S1  | ∞       | d0 =    | 0.000  |       |    |       |
| R1  | 1.626   | d1 =    | 0.538  | n1 1.544 | v1 | 56.1 |
| R2  | −6.686  | d2 =    | 0.062  |       |    |       |
| R3  | 37.750  | d3 =    | 0.330  | n2 1.640 | v2 | 23.4 |
| R4  | 2.352   | d4 =    | 0.815  |       |    |       |
| R5  | −2.302  | d5 =    | 0.579  | n3 1.544 | v3 | 56.1 |
| R6  | −0.845  | d6 =    | 0.089  |       |    |       |
| R7  | 3.307   | d7 =    | 0.400  | n4 1.544 | v4 | 56.1 |
| R8  | 0.856   | d8 =    | 0.500  |       |    |       |
| R9  | ∞       | d9 =    | 0.300  | n5 1.517 | v5 | 64.17 |
| R10 | ∞       | d10 =   | 0.767  |       |    |       |

TABLE 6

| | conic constant | aspheric constant | | | | |
| --- | --- | --- | --- | --- | --- | --- |
| | k | A4 | A6 | A8 | A10 | A12 |
| R1 | −8.6130E−01 | 2.8158E−03 | −4.3287E−04 | −3.2208E−02 | −1.3428E−02 | 0.0000E+00 |
| R2 | −2.0423E+02 | −5.1127E−02 | −1.1561E−01 | 1.9288E−01 | −7.1225E−02 | 0.0000E+00 |
| R3 | 0.0000E+00 | 8.2588E−02 | −3.1616E−01 | 5.0718E−01 | −1.7875E−01 | 0.0000E+00 |
| R4 | 4.5761E+00 | 2.6619E−02 | −1.3618E−01 | 1.6316E−01 | −4.2345E−01 | 0.0000E+00 |
| R5 | −1.0772E+00 | 2.3150E−02 | −1.2204E−01 | 1.1094E−01 | −7.5557E−02 | 2.5327E−02 |
| R6 | −3.9563E+00 | −1.2785E−01 | 3.0552E−02 | −4.5331E−03 | 1.9723E−02 | −4.9585E−03 |
| R7 | 5.5583E−01 | −2.0862E−01 | 6.7544E−02 | 5.9718E−03 | −8.0847E−03 | 1.2461E−03 |
| R8 | −6.1695E+00 | −1.2704E−01 | 5.1197E−02 | −1.6854E−02 | 3.4207E−03 | −3.4154E−04 |

TABLE 8

| | conic constant | aspheric constant | | | | |
|---|---|---|---|---|---|---|
| | k | A4 | A6 | A8 | A10 | A12 |
| R1 | −9.8359E−01 | −1.9080E−03 | 4.3815E−05 | −2.8769E−02 | −1.5456E−02 | 0.0000E+00 |
| R2 | −2.5340E+02 | −3.4947E−02 | −1.1484E−01 | 1.9457E−01 | −5.7522E−02 | 0.0000E+00 |
| R3 | 0.0000E+00 | 9.4463E−02 | −30.843E−01 | 5.1106E−01 | −1.7896E−01 | 0.0000E+00 |
| R4 | 4.7265E+00 | 2.1808E−02 | −1.4070E−01 | 1.5494E−01 | −5.1885E−02 | 0.0000E+00 |
| R5 | −1.2740E+00 | 2.5030E−02 | −1.2315E−01 | 1.1802E−01 | −7.2206E−02 | 2.4283E−02 |
| R6 | −3.9432E+00 | −1.2670E−01 | 3.1876E−02 | −2.3804E−03 | 2.0614E−02 | −4.3756E−03 |
| R7 | 5.7300E−01 | −2.0794E−01 | 6.7451E−02 | 5.9387E−03 | −8.0558E−03 | 1.2636E−03 |
| R8 | −6.1907E+00 | −1.2531E−01 | 5.1922E−02 | −1.6766E−02 | 3.4315E−03 | −3.4041E−04 |

Figure 14:
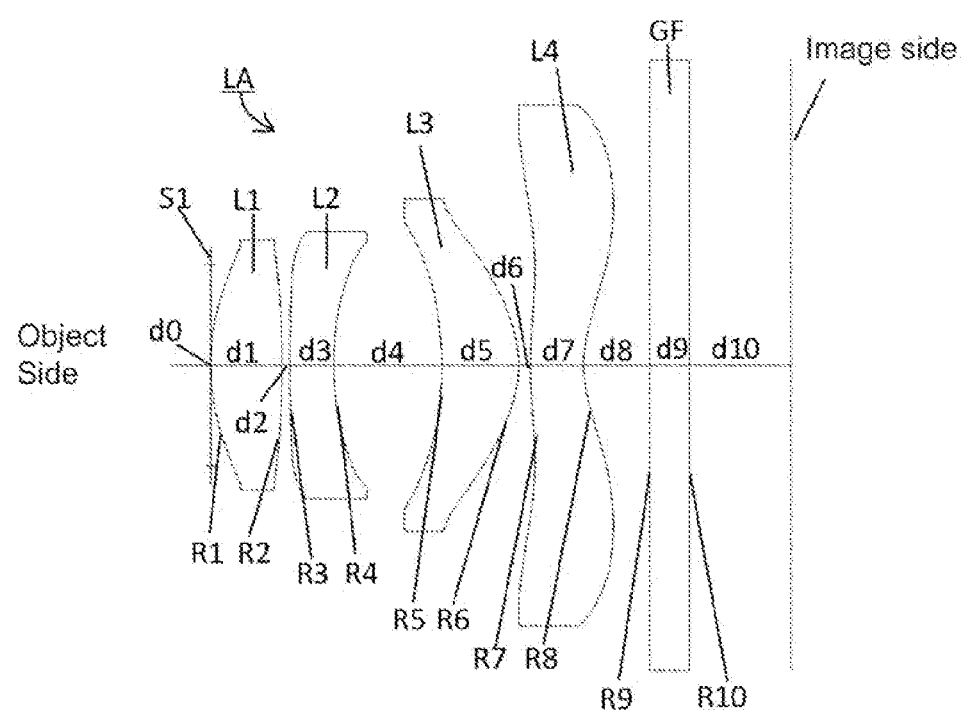
FIG. 14 is a schematic view of the imaging lens according to a fourth embodiment.
Figure 15:
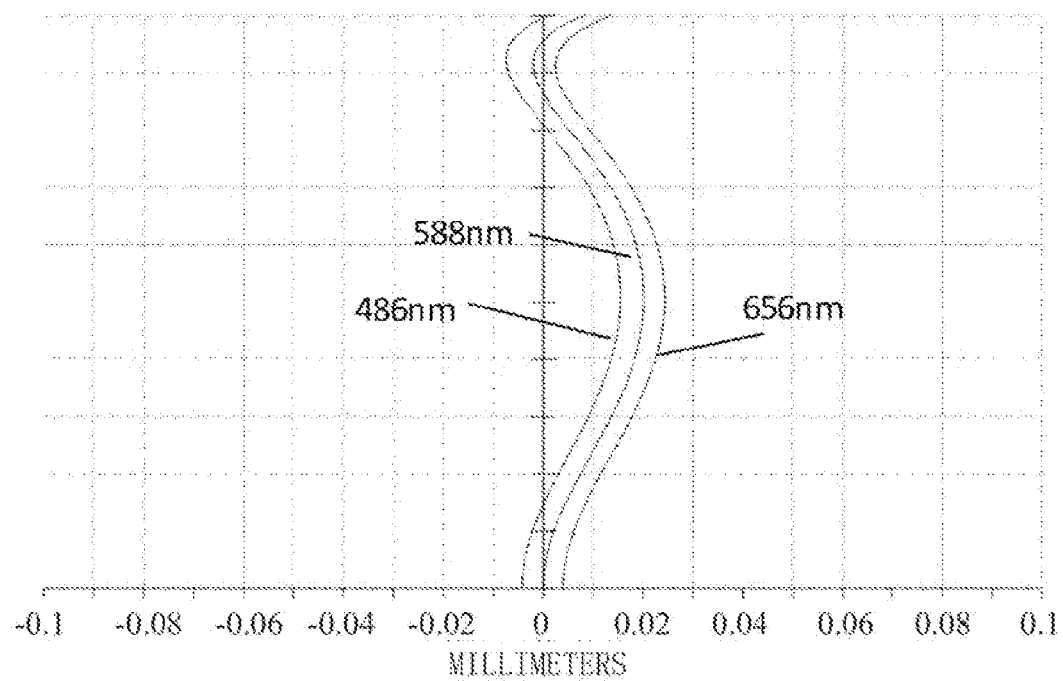
FIGS. 15~16, 17A, 17B are graphs respectively showing spherical aberration, lateral color aberration, astigmatism and distortion of FIG. 13.
Figure 16:
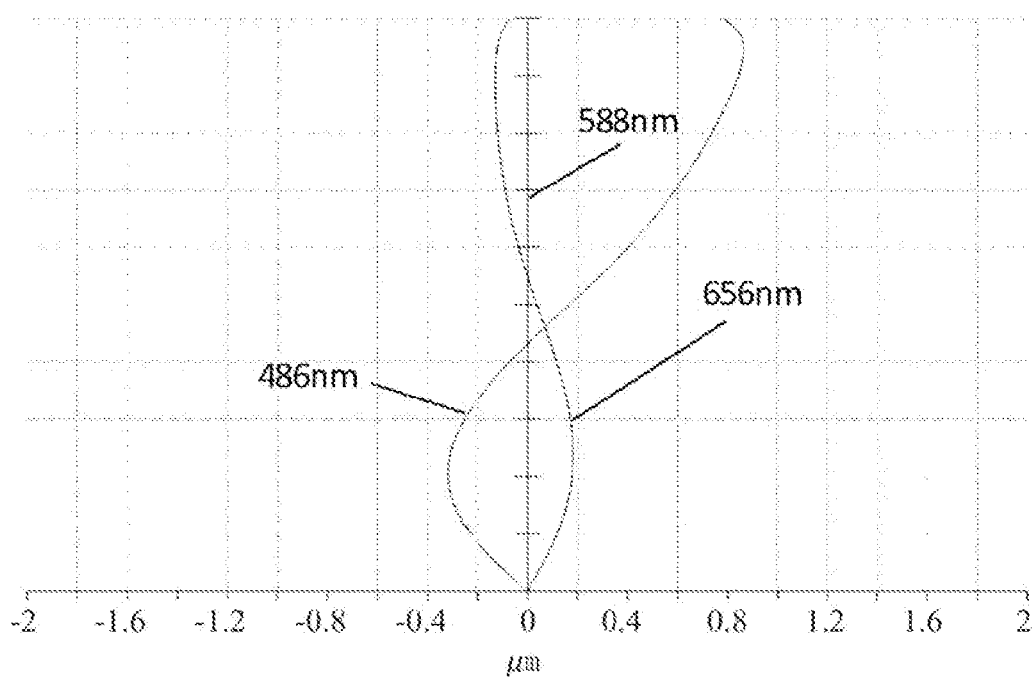
Figure 17A:
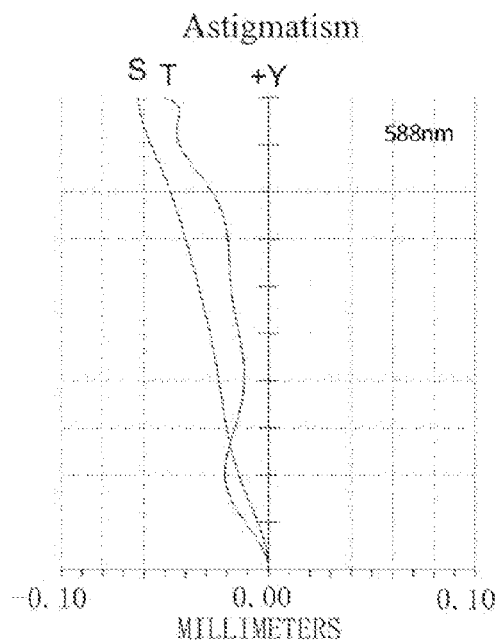
Figure 17B:
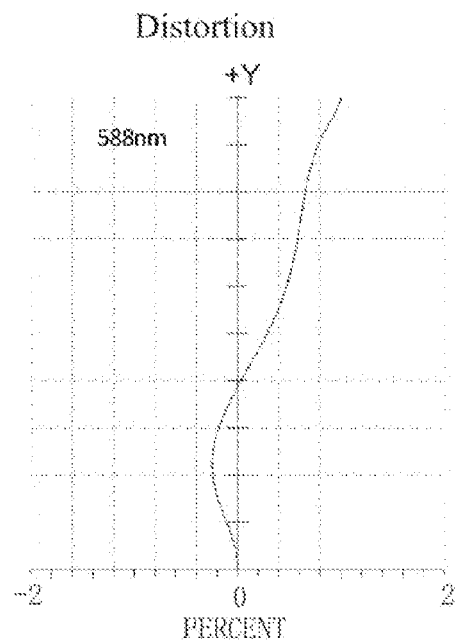

Referring to FIG. 14, an imaging lens LA according to a fourth embodiment is shown. FIGS. 15~16, 17A, 17B, are graphs of aberrations (spherical aberration, lateral color aberration, astigmatism, and distortion) of the fourth specification of the exemplary embodiment of the imaging lens LA. In FIGS. 15 and 16, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the fourth specification of the exemplary embodiment is from −0.1 mm to 0.1 mm, the lateral color aberration of the fourth specification of the exemplary embodiment is from −2 mm to 2 mm. As illustrated in FIG. 17A, the astigmatism is shown at the d light (wavelength: 588 nm) for both the sagittal image surface S and the tangential image surface T. The astigmatism of the fourth specification of the exemplary embodiment of the imaging lens LA is from −0.10 mm to 0.10 mm. In FIG. 17B, the distortion of the fourth specification of the exemplary embodiment of the imaging lens LA is from −2% to 2%.

In the fourth specification, not only the overall length of the imaging lens LA is reduced and the brightness is ensured (seen in Table 25, 2ω=63.1°, TTL=4.380 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 9-10 show a fifth specification of the fifth embodiment of the imaging lens LA.

TABLE 9

| | R | d | | nd | | vd | |
|---|---|---|---|---|---|---|---|
| S1 | ∞ | d0 = | 0.000 | | | | |
| R1 | 1.613 | d1 = | 0.593 | n1 | 1.544 | v1 | 56.1 |
| R2 | −5.992 | d2 = | 0.060 | | | | |
| R3 | 43.507 | d3 = | 0.346 | n2 | 1.640 | v2 | 23.4 |
| R4 | 2.352 | d4 = | 0.631 | | | | |
| R5 | −2.229 | d5 = | 0.548 | n3 | 1.544 | v3 | 56.1 |
| R6 | −0.840 | d6 = | 0.268 | | | | |
| R7 | 3.907 | d7 = | 0.388 | n4 | 1.544 | v4 | 56.1 |
| R8 | 0.856 | d8 = | 0.500 | | | | |
| R9 | ∞ | d9 = | 0.300 | n5 | 1.517 | v5 | 64.17 |
| R10 | ∞ | d10 = | 0.400 | | | | |

TABLE 10

| | conic constant | aspheric constant | | | | |
|---|---|---|---|---|---|---|
| | k | A4 | A6 | A8 | A10 | A12 |
| R1 | −8.0477E−01 | 4.3553E−03 | −1.2756E−02 | −3.6843E−02 | −3.1766E−02 | 0.0000E+00 |
| R2 | −1.0847E+02 | −5.8440E−02 | −1.2761E−01 | 1.6705E−01 | −1.0195E−01 | 0.0000E+00 |
| R3 | 0.0000E+00 | 4.3374E−02 | −3.2744E−01 | 5.0289E−01 | −1.8573E−01 | 0.0000E+00 |
| R4 | 4.1238E+00 | 1.5815E−02 | −1.6029E−01 | 1.6373E−01 | −4.0825E−02 | 0.0000E+00 |
| R5 | −3.2239E+00 | 4.2801E−02 | −1.2917E−01 | 1.1601E−01 | −7.9895E−02 | 1.5579E−02 |
| R6 | −3.9619E+00 | −1.1650E−01 | 3.6285E−02 | −2.1487E−03 | 2.2420E−02 | −3.8709E−03 |
| R7 | 5.9931E−01 | −2.0823E−01 | 6.7769E−02 | 5.8513E−03 | −8.1083E−03 | 1.2720E−03 |
| R8 | −6.2852E+00 | −1.3091E−01 | 5.1653E−02 | −1.6715E−02 | 3.2510E−03 | −3.1093E−04 |

Figure 18:
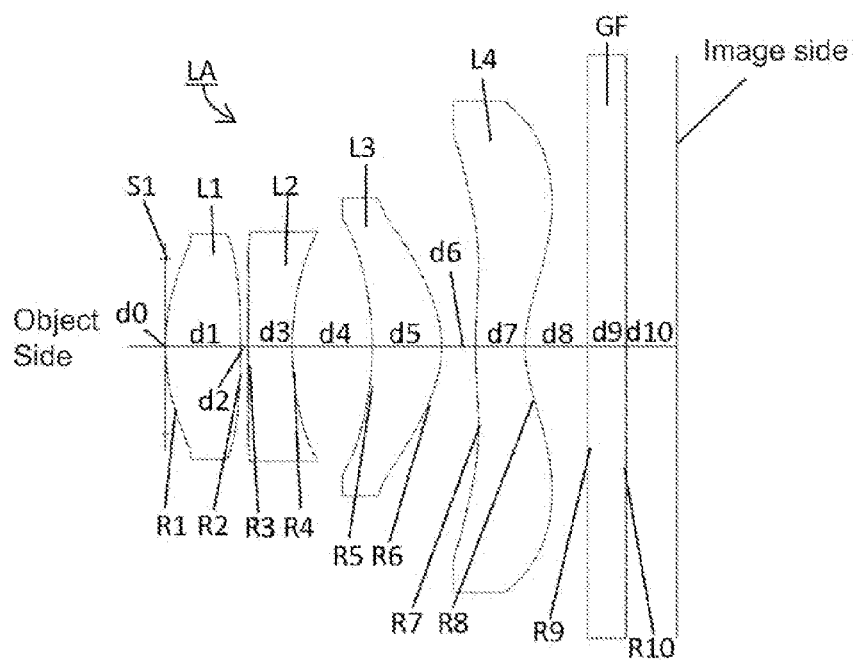
FIG. 18 is a schematic view of the imaging lens according to a fifth embodiment.
Figure 19:
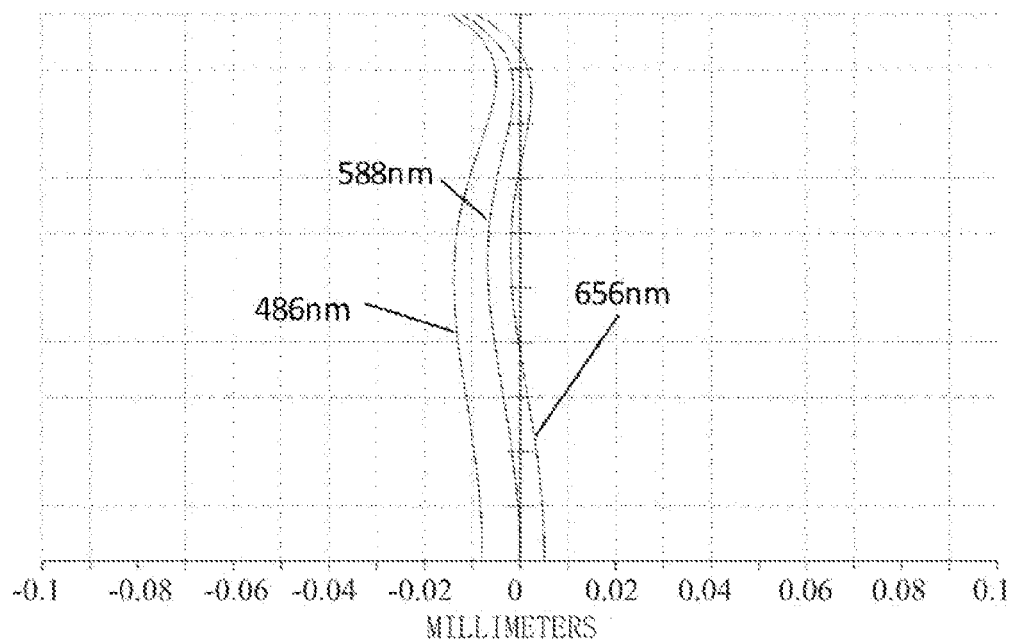
FIGS. 19~20, 21A, 21B are graphs respectively showing spherical aberration, lateral color aberration, astigmatism and distortion of FIG. 17.
Figure 20:
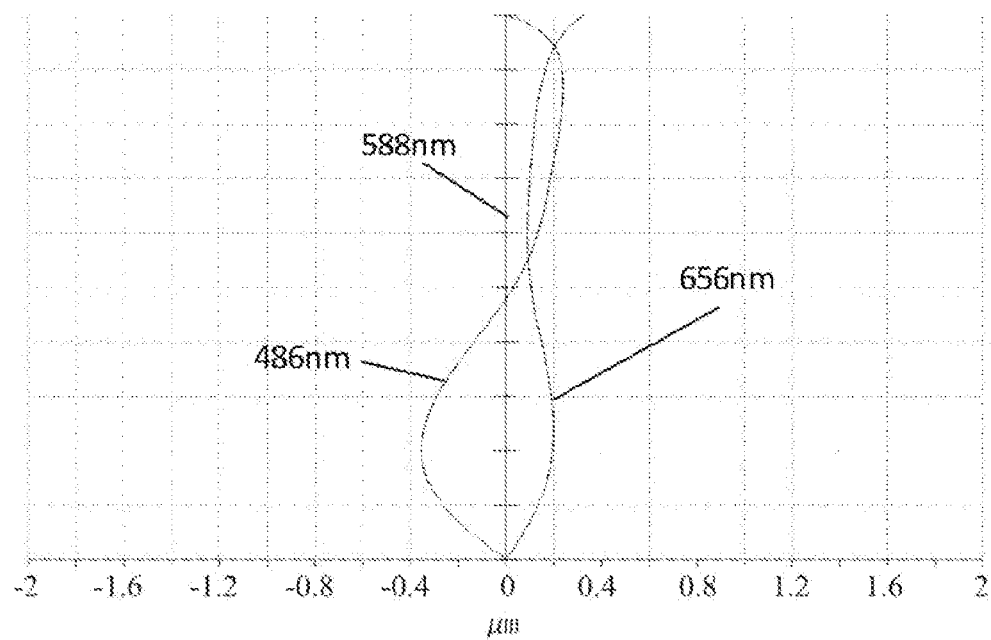
Figure 21A:
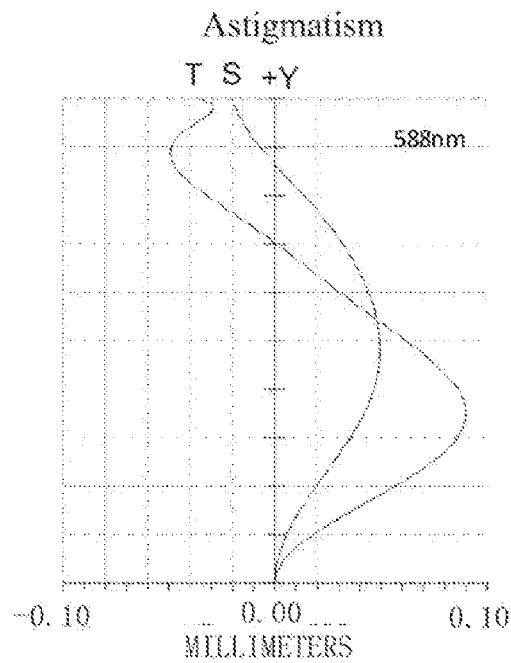
Figure 21B:
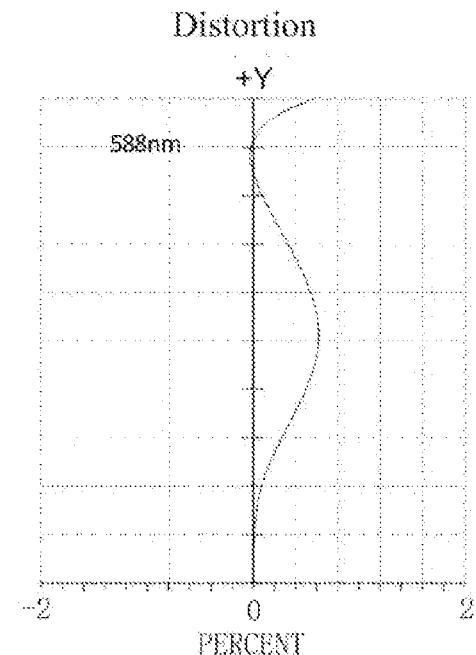

Referring to FIG. 18, an imaging lens LA according to a fifth embodiment is shown. FIGS. 19~20, 21A, 21B, are graphs of aberrations (spherical aberration, lateral color aberration, astigmatism, and distortion) of the fifth specification of the exemplary embodiment of the imaging lens LA. In FIGS. 19 and 20, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the fifth specification of the exemplary embodiment is from −0.1 mm to 0.1 mm, the lateral color aberration of the first specification of the exemplary embodiment is from −2 mm to 2 mm. As illustrated in FIG. 21A, the astigmatism is shown at the d light (wavelength: 588 nm) for both the sagittal image surface S and the tangential image surface T. The astigmatism of the fifth specification of the exemplary embodiment of the imaging lens LA is from −0.10 mm to 0.10 mm. In FIG. 21B, the distortion of the fifth specification of the exemplary embodiment of the imaging lens LA is from −2% to 2%.

In the fifth specification, not only the overall length of the imaging lens LA is reduced and the brightness is ensured (seen in Table 25, 2ω=69.2°, TTL=4.034 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 11-12 show a sixth specification of the sixth embodiment of the imaging lens LA.

TABLE 11

|    | R       | d          |    | nd    |    | vd    |
|----|---------|------------|----|-------|----|-------|
| S1 | ∞       | d0 = 0.000 |    |       |    |       |
| R1 | 1.699   | d1 = 0.589 | n1 | 1.544 | v1 | 56.1  |
| R2 | −5.080  | d2 = 0.059 |    |       |    |       |
| R3 | 39.148  | d3 = 0.329 | n2 | 1.640 | v2 | 23.4  |
| R4 | 2.363   | d4 = 0.806 |    |       |    |       |
| R5 | −2.298  | d5 = 0.613 | n3 | 1.544 | v3 | 56.1  |
| R6 | −0.844  | d6 = 0.091 |    |       |    |       |
| R7 | 3.311   | d7 = 0.402 | n4 | 1.544 | v4 | 56.1  |
| R8 | 0.857   | d8 = 0.500 |    |       |    |       |
| R9 | ∞       | d9 = 0.300 | n5 | 1.517 | v5 | 64.17 |
| R10| ∞       | d10 = 0.648|    |       |    |       |

TABLE 12

|    | conic constant | aspheric constant | | | | |
|----|---------------|-----------|-----------|-----------|-----------|-----------|
|    | k             | A4        | A6        | A8        | A10       | A12       |
| R1 | −8.7548E−01   | 3.0313E−03 | −9.7556E−03 | −3.8332E−02 | −1.7400E−02 | 0.0000E+00 |
| R2 | −1.4488E+02   | −4.9158E−02 | −1.1679E−01 | 1.8980E−01 | −7.3604E−02 | 0.0000E+00 |
| R3 | 0.0000E+00    | −8.8917E−02 | −3.1427E−01 | 5.0770E−01 | −1.7957E−01 | 0.0000E+00 |
| R4 | 4.6521E+00    | 2.3502E−02 | −1.4596E−01 | 1.5667E−01 | −4.2776E−02 | 0.0000E+00 |
| R5 | −1.1645E+00   | 2.3987E−02 | −1.2274E−01 | 1.1474E−01 | −7.3940E−02 | 2.6225E−02 |
| R6 | −3.9393E+00   | −1.2765E−01 | 3.1131E−02 | −3.6975E−03 | 2.0328E−02 | −4.6742E−03 |
| R7 | 5.1308E−01    | −2.0881E−01 | 6.7479E−02 | 5.9541E−03 | −8.0890E−03 | 1.2464E−03 |
| R8 | −6.3089E+00   | −1.2651E−01 | 5.1323E−02 | −1.6831E−02 | 3.4273E−03 | −3.3895E−04 |

Figure 22:
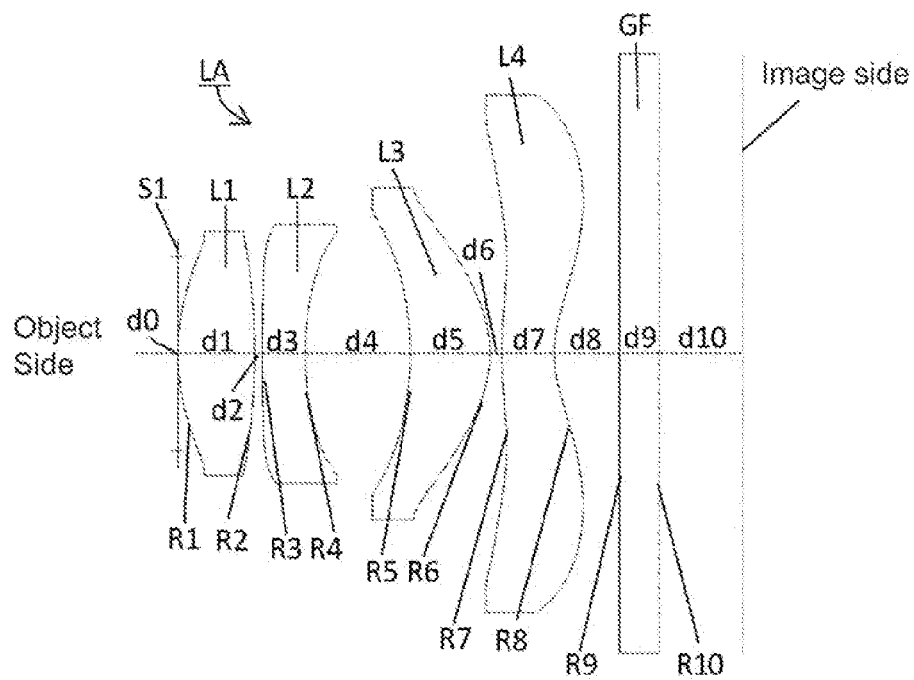
FIG. 22 is a schematic view of the imaging lens according to a sixth embodiment.
Figure 23:
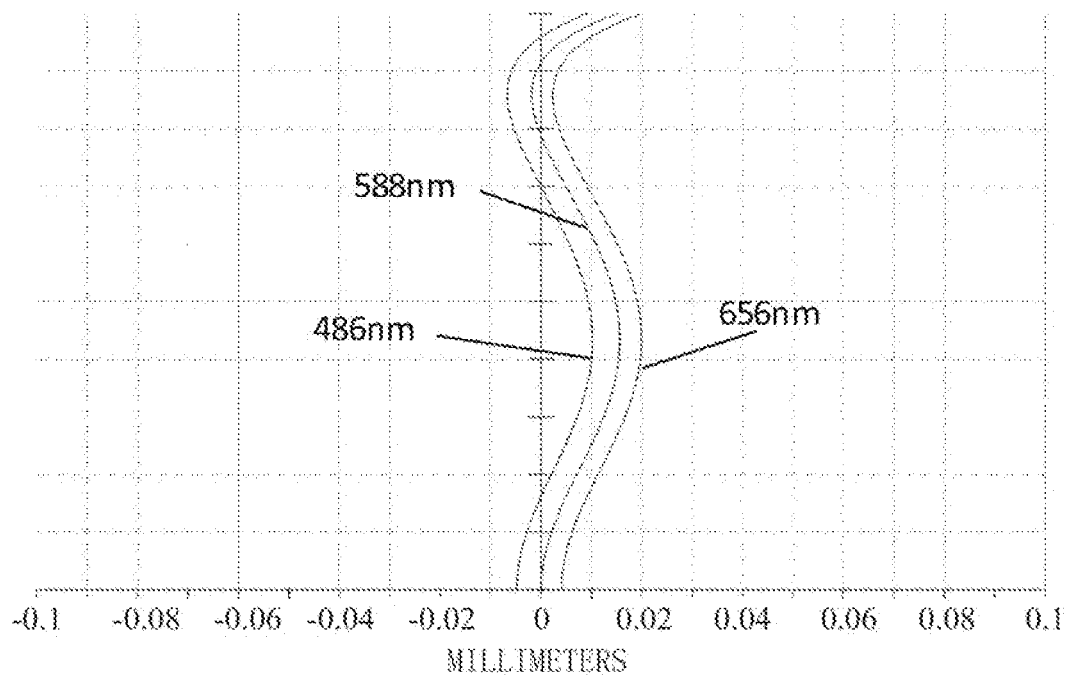
FIGS. 23~24, 25A, 25B are graphs respectively showing spherical aberration, lateral color aberration, astigmatism and distortion of FIG. 21.
Figure 24:
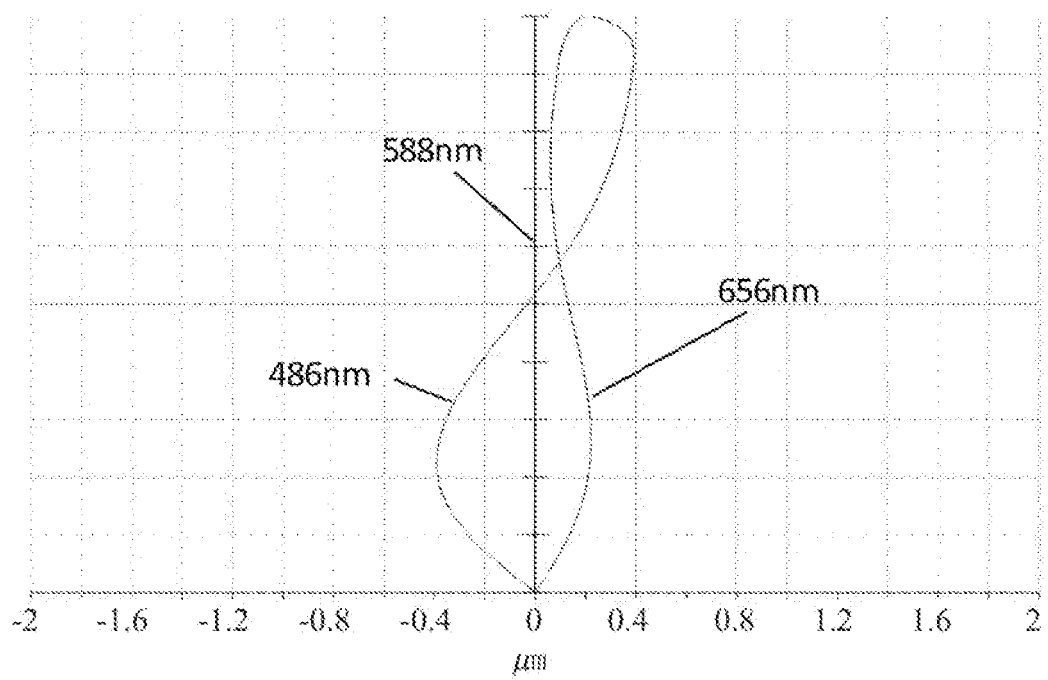
Figure 25A:
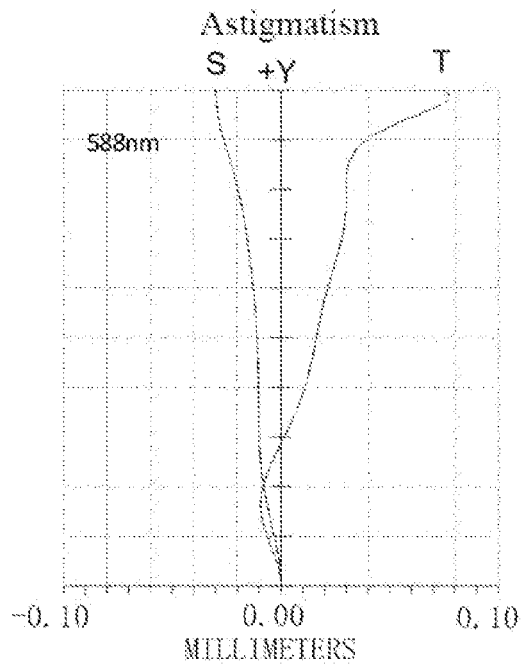
Figure 25B:
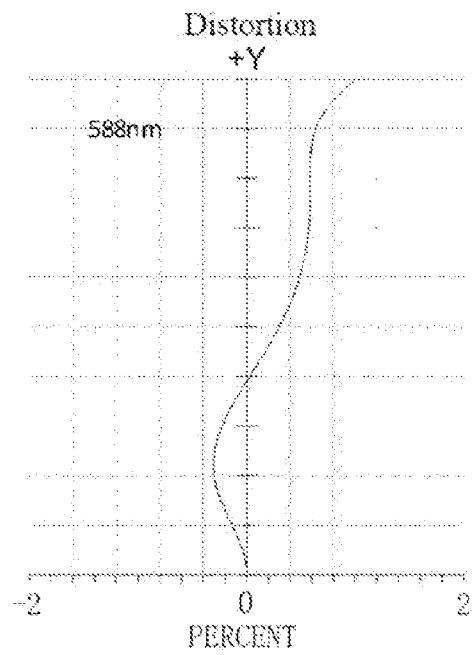

Referring to FIG. 22, an imaging lens LA according to a sixth embodiment is shown. FIGS. 23~24, 25A, 25B, are graphs of aberrations (spherical aberration, lateral color aberration, astigmatism, and distortion) of the sixth specification of the exemplary embodiment of the imaging lens LA. In FIGS. 23 and 24, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the sixth specification of the exemplary embodiment is from −0.1 mm to 0.1 mm, the lateral color aberration of the first specification of the exemplary embodiment is from −2 mm to 2 mm. As illustrated in FIG. 25A, the astigmatism is shown at the d light (wavelength: 588 nm) for both the sagittal image surface S and the tangential image surface T. The astigmatism of the sixth specification of the exemplary embodiment of the imaging lens LA is from −0.15 mm to 0.15 mm. In FIG. 25B, the distortion of the sixth specification of the exemplary embodiment of the imaging lens LA is from −2% to 2%.

In the sixth specification, not only the overall length of the imaging lens LA is reduced and the brightness is ensured (seen in Table 25, 2ω=64.9°, TTL=4.337 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 13-14 show a seventh specification of the seventh embodiment of the imaging lens LA.

TABLE 13

|    | R       | d          |    | nd    |    | vd    |
|----|---------|------------|----|-------|----|-------|
| S1 | ∞       | d0 = 0.000 |    |       |    |       |
| R1 | 1.680   | d1 = 0.617 | n1 | 1.544 | v1 | 56.1  |
| R2 | −6.999  | d2 = 0.040 |    |       |    |       |
| R3 | 6.141   | d3 = 0.300 | n2 | 1.640 | v2 | 23.4  |
| R4 | 1.981   | d4 = 0.925 |    |       |    |       |
| R5 | −2.186  | d5 = 0.563 | n3 | 1.544 | v3 | 56.1  |
| R6 | −0.855  | d6 = 0.113 |    |       |    |       |
| R7 | 3.870   | d7 = 0.379 | n4 | 1.544 | v4 | 56.1  |
| R8 | 0.845   | d8 = 0.500 |    |       |    |       |
| R9 | ∞       | d9 = 0.300 | n5 | 1.517 | v5 | 64.17 |
| R10| ∞       | d10 = 0.613|    |       |    |       |

TABLE 14

|    | conic constant | aspheric constant | | | | |
|----|---------------|-----------|-----------|-----------|-----------|-----------|
|    | k             | A4        | A6        | A8        | A10       | A12       |
| R1 | −1.0791E+00   | −1.0449E−02 | −1.4728E−02 | −8.1900E−02 | −2.1841E−02 | 0.0000E+00 |
| R2 | −3.6219E+02   | −1.0333E−01 | −1.6554E−01 | 1.9559E−01 | −1.1266E−01 | 0.0000E+00 |
| R3 | 0.0000E+00    | 7.3115E−02 | −3.4325E−01 | 4.4752E−01 | −1.5114E−01 | 0.0000E+00 |
| R4 | 2.2414E+00    | 4.6895E−02 | −1.2397E−01 | 1.2864E−01 | −3.7455E−02 | 0.0000E+00 |
| R5 | −8.2612E−01   | 1.9291E−02 | −1.1704E−01 | 1.2465E−01 | −6.8965E−02 | 1.1710E−02 |
| R6 | −4.2024E+00   | −1.2047E−01 | 3.2870E−02 | −3.2419E−03 | 2.0755E−02 | −6.9888E−03 |
| R7 | 7.1285E−01    | −2.0864E−01 | 6.6366E−02 | 5.5455E−03 | −8.1191E−03 | 1.1983E−03 |
| R8 | −6.3027E+00   | −1.2492E−01 | 5.0391E−02 | −1.7038E−02 | 3.5303E−03 | −4.0044E−04 |

Figure 26:
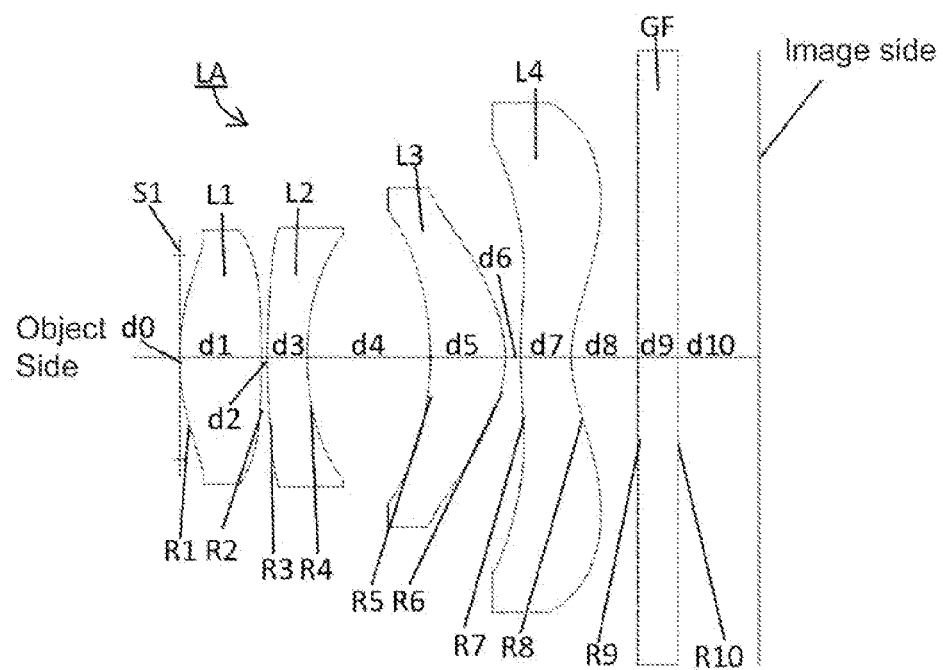
FIG. 26 is a schematic view of the imaging lens according to a seventh embodiment.
Figure 27:
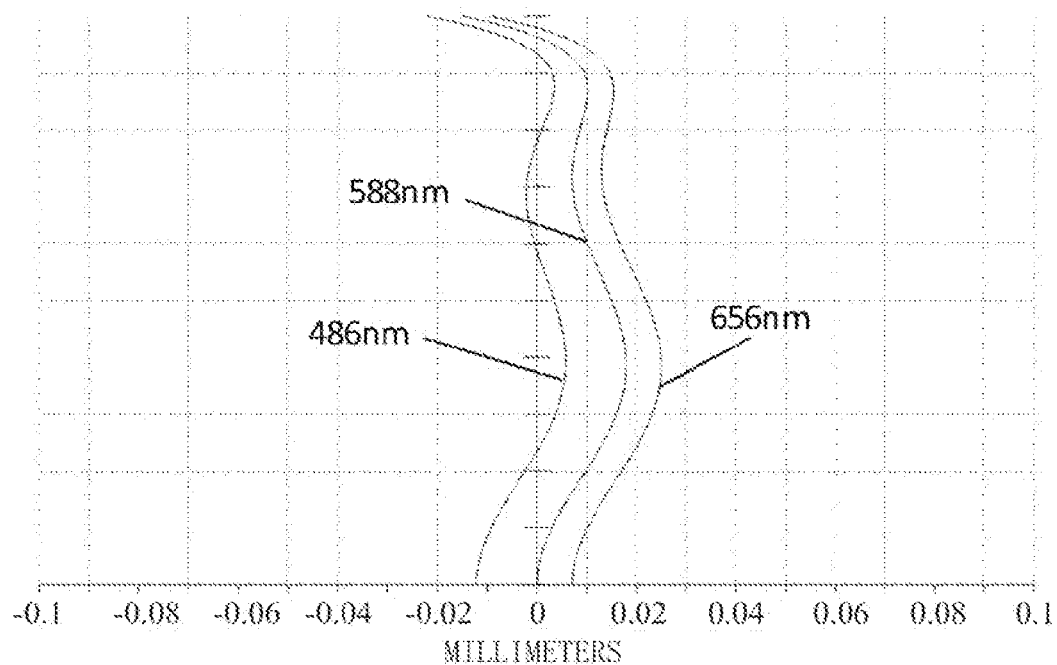
FIGS. 27~28, 29A, 29B are graphs respectively showing spherical aberration, lateral color aberration, astigmatism and distortion of FIG. 25.
Figure 28:
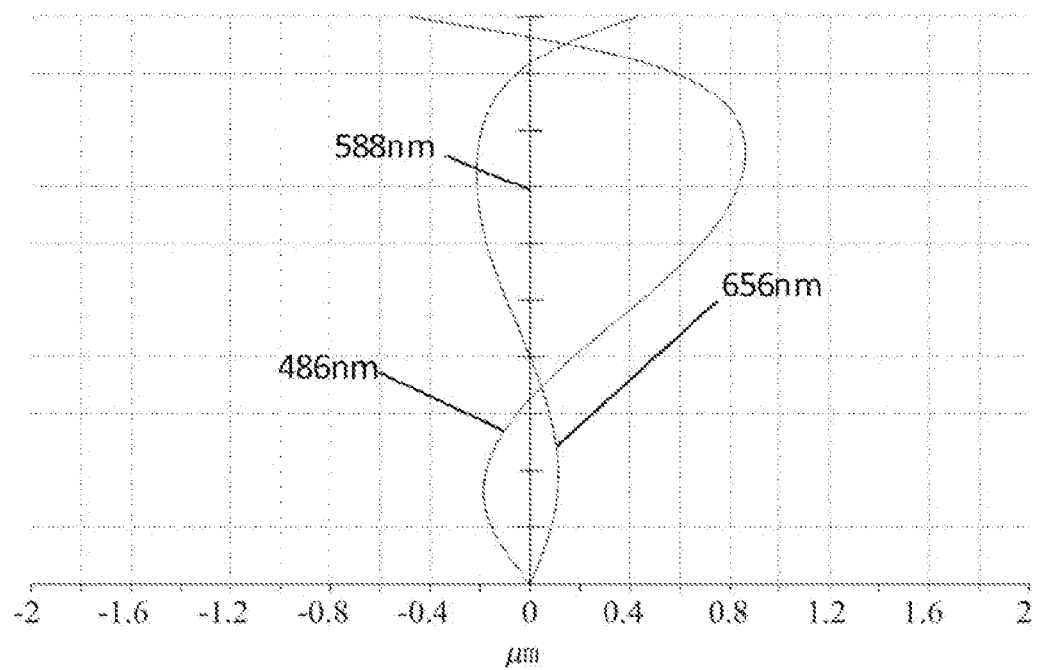
Figure 29A:
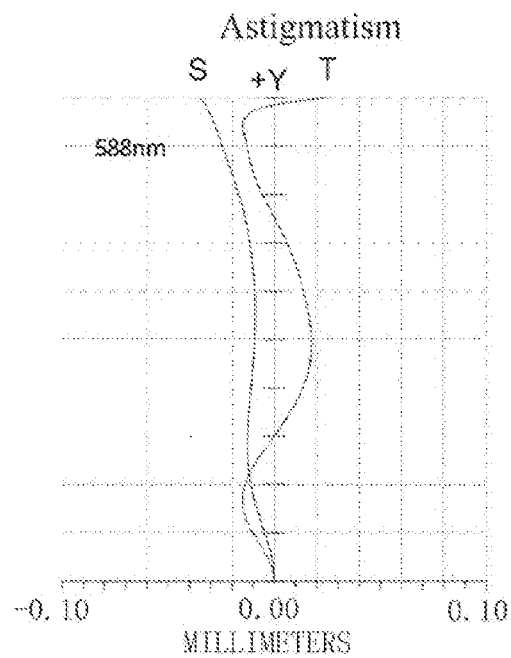
Figure 29B:
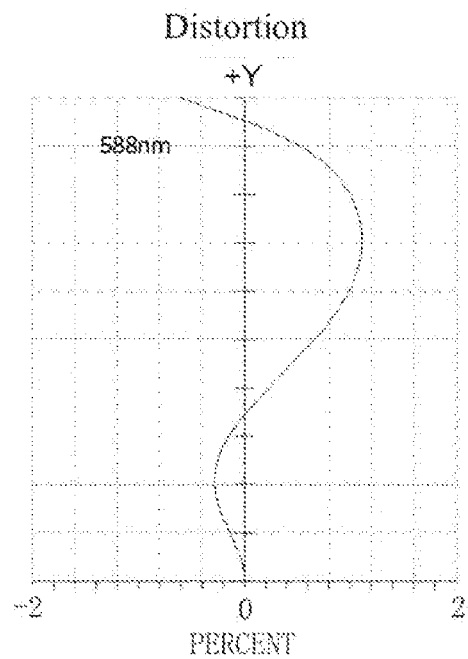

Referring to FIG. 26, an imaging lens LA according to a seventh embodiment is shown. FIGS. 27~28, 29A, 29B, are graphs of aberrations (spherical aberration, lateral color aberration, astigmatism, and distortion) of the seventh specification of the exemplary embodiment of the imaging lens LA. In FIGS. 27 and 28, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the seventh specification of the exemplary embodiment is from −0.1 mm to 0.1 mm, the lateral color aberration of the first specification of the exemplary embodiment is from −2 mm to 2 mm. As illustrated in FIG. 29A, the astigmatism is shown at the d light (wavelength: 588 nm) for both the sagittal image surface S and the tangential image surface T. The astigmatism of the seventh specification of the exemplary embodiment of the imaging lens LA is from −0.10 mm to 0.10 mm. In FIG. 29B, the distortion of the seventh specification of the exemplary embodiment of the imaging lens LA is from −2% to 2%.

In the seventh specification, not only the overall length of the imaging lens LA is reduced and the brightness is ensured (seen in Table 25, 2ω=62.5°, TTL=4.350 mm, FNo=2.5), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 15-16 show an eighth specification of the eighth embodiment of the imaging lens LA.

Figure 30:
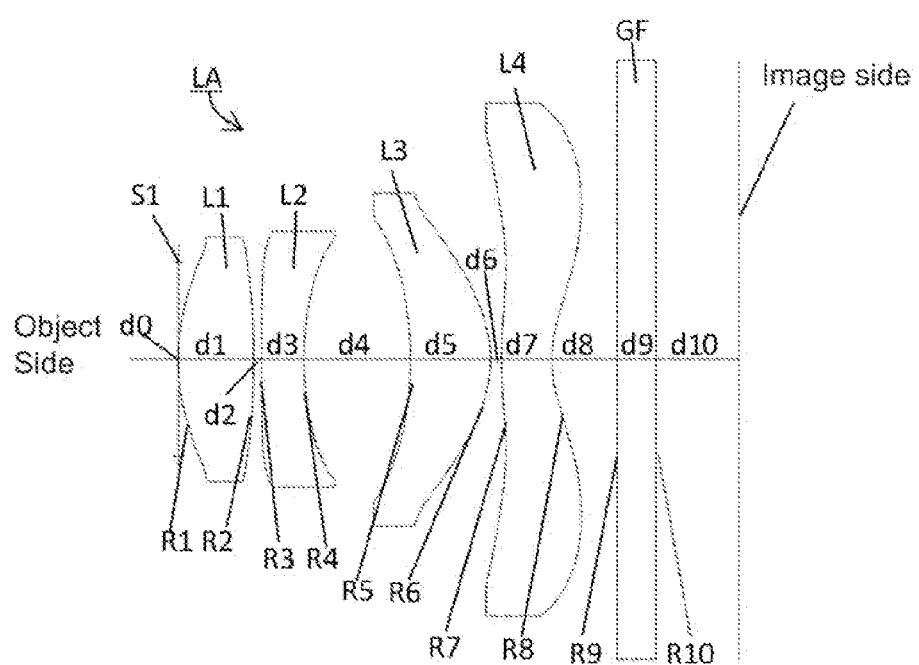
FIG. 30 is a schematic view of the imaging lens according to an eighth embodiment.
Figure 31:
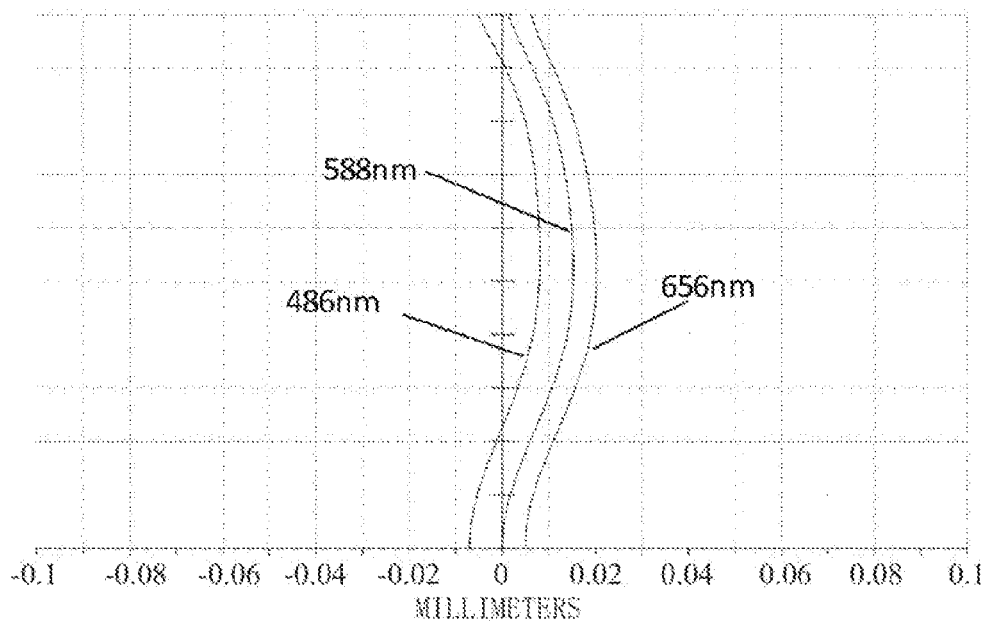
FIGS. 31~32, 33A, 33B are graphs respectively showing spherical aberration, lateral color aberration, astigmatism and distortion of FIG. 29.
Figure 32:
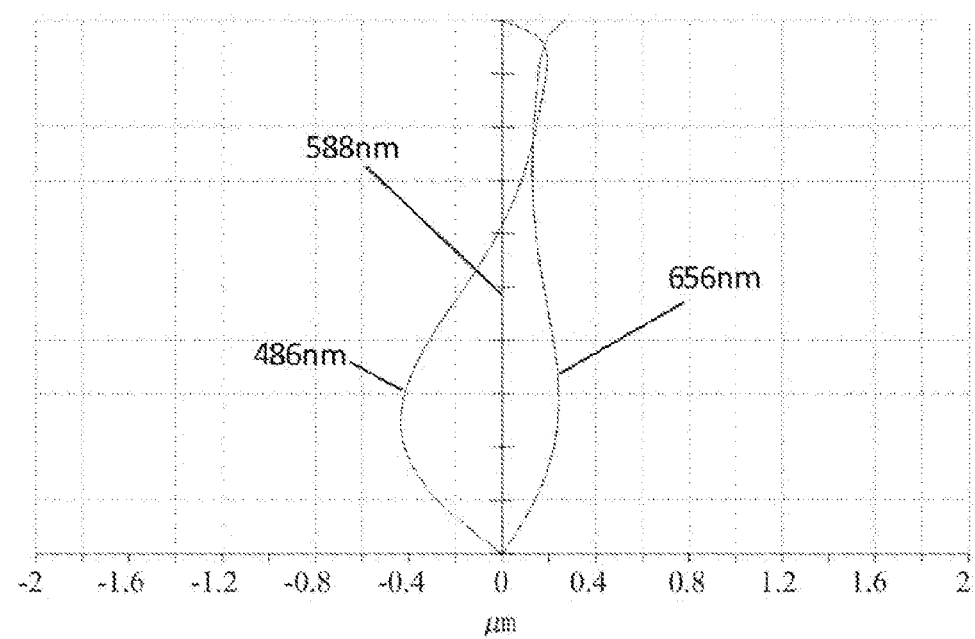
Figure 33A:
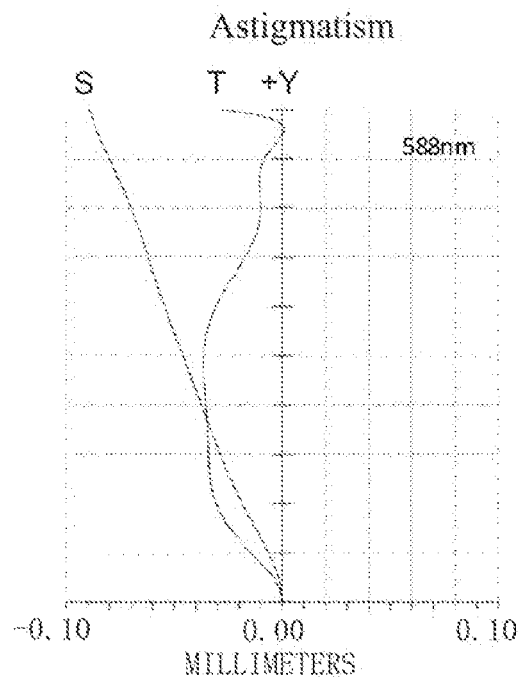
Figure 33B:
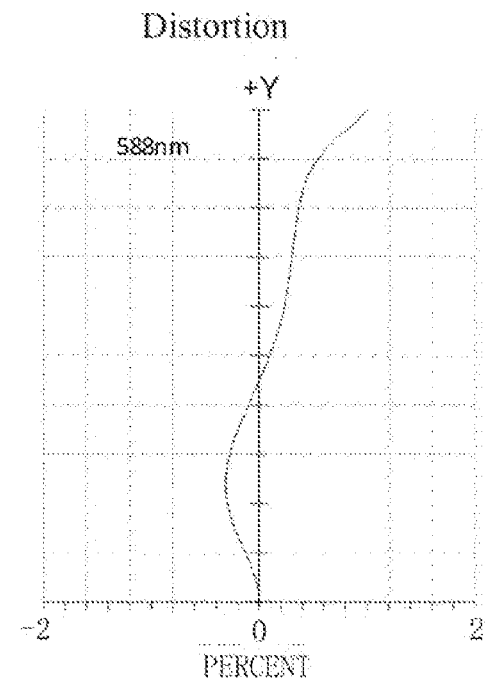

Referring to FIG. 30, an imaging lens LA according to an eighth embodiment is shown. FIGS. 31~32, 33A, 33B, are graphs of aberrations (spherical aberration, lateral color aberration, astigmatism, and distortion) of the eighth specification of the exemplary embodiment of the imaging lens LA. In FIGS. 31 and 32, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the eighth specification of the exemplary embodiment is from −0.1 mm to 0.1 mm, the lateral color aberration of the eighth specification of the exemplary embodiment is from −2 mm to 2 mm. As illustrated in FIG. 33A, the astigmatism is shown at the d light (wavelength: 588 nm) for both the sagittal image surface S and the tangential image surface T. The astigmatism of the eighth specification of the exemplary embodiment of the imaging lens LA is from −0.10 mm to 0.10 mm. In FIG. 33B, the distortion of the eighth specification of the exemplary embodiment of the imaging lens LA is from −2% to 2%.

In the eighth specification, not only the overall length of the imaging lens LA is reduced and the brightness is ensured (seen in Table 25, 2ω=65.0°, TTL=4.315 mm, FNo=2.4), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 17-18 show a ninth specification of the ninth embodiment of the imaging lens LA.

TABLE 15

|  | R | d |  | nd |  | vd |
|---|---|---|---|---|---|---|
| S1 | ∞ | d0 = | 0.000 |  |  |  |
| R1 | 1.656 | d1 = | 0.579 | n1 | 1.544 | v1 | 56.1 |
| R2 | −6.463 | d2 = | 0.059 |  |  |  |
| R3 | 26.958 | d3 = | 0.329 | n2 | 1.640 | v2 | 23.4 |
| R4 | 2.451 | d4 = | 0.820 |  |  |  |
| R5 | −2.532 | d5 = | 0.617 | n3 | 1.544 | v3 | 56.1 |
| R6 | −0.858 | d6 = | 0.084 |  |  |  |
| R7 | 3.366 | d7 = | 0.386 | n4 | 1.544 | v4 | 56.1 |
| R8 | 0.851 | d8 = | 0.500 |  |  |  |
| R9 | ∞ | d9 = | 0.300 | n5 | 1.517 | v5 | 64.17 |
| R10 | ∞ | d10 = | 0.641 |  |  |  |

TABLE 17

|  | R | d |  | nd |  | vd |
|---|---|---|---|---|---|---|
| S1 | ∞ | d0 = | 0.030 |  |  |  |
| R1 | 1.548 | d1 = | 0.674 | n1 | 1.544 | v1 | 56.1 |
| R2 | −6.055 | d2 = | 0.040 |  |  |  |
| R3 | 38.941 | d3 = | 0.302 | n2 | 1.640 | v2 | 23.4 |
| R4 | 2.291 | d4 = | 0.797 |  |  |  |
| R5 | −1.594 | d5 = | 0.445 | n3 | 1.544 | v3 | 56.1 |
| R6 | −0.839 | d6 = | 0.139 |  |  |  |
| R7 | 2.917 | d7 = | 0.419 | n4 | 1.544 | v4 | 56.1 |
| R8 | 0.857 | d8 = | 0.500 |  |  |  |
| R9 | ∞ | d9 = | 0.300 | n5 | 1.517 | v5 | 64.17 |
| R10 | ∞ | d10 = | 0.704 |  |  |  |

TABLE 16

|  | conic constant | aspheric constant | | | | |
|---|---|---|---|---|---|---|
|  | k | A4 | A6 | A8 | A10 | A12 |
| R1 | −9.3193E−01 | 4.7424E−04 | −8.7026E−03 | −3.4025E−02 | −1.4447E−02 | 0.0000E+00 |
| R2 | −2.4708E+02 | −4.6403E−02 | −1.2136E−01 | 1.8438E−01 | −7.5827E−02 | 0.0000E+00 |
| R3 | 0.0000E+00 | 8.4363E−02 | −3.1733E−01 | 5.0411E−01 | −1.8449E−01 | 0.0000E+00 |
| R4 | 4.7195E+00 | 2.9598E−02 | −1.4043E−01 | 1.5992E−01 | −3.9558E−02 | 0.0000E+00 |
| R5 | −8.5414E−01 | 2.1107E−02 | −1.2331E−01 | 1.1483E−01 | −7.3989E−02 | 2.6098E−02 |
| R6 | −4.0378E+00 | −1.2720E−01 | 3.1153E−02 | −4.2270E−03 | 2.0204E−02 | −4.7620E−03 |
| R7 | 5.2724E−01 | −2.0866E−01 | 6.7532E−02 | 5.9754E−03 | −8.0801E−03 | 1.2502E−03 |
| R8 | −5.9896E+00 | −1.2660E−01 | 5.1414E−02 | −1.6818E−02 | 3.4291E−03 | −3.3886E−04 |

TABLE 18

| | conic constant | aspheric constant | | | | |
|---|---|---|---|---|---|---|
| | k | A4 | A6 | A8 | A10 | A12 |
| R1 | −7.6636E−01 | 7.9749E−03 | −1.6769E−02 | −4.1295E−02 | −6.3517E−03 | 0.0000E+00 |
| R2 | −1.7524E+02 | −5.8214E−02 | −1.3106E−01 | 1.7969E−01 | −8.3389E−02 | 0.0000E+00 |
| R3 | 0.0000E+00 | 7.6879E−02 | −3.1725E−01 | 4.9902E−01 | −1.8295E−01 | 0.0000E+00 |
| R4 | 4.1313E+00 | 2.6875E−02 | −1.1494E−01 | 1.6270E−01 | −1.8652E−02 | 0.0000E+00 |
| R5 | −1.0802E+00 | 2.7908E−02 | −1.4132E−01 | 8.7801E−02 | −5.7981E−02 | −1.2891E−02 |
| R6 | −3.8769E+00 | −1.1648E−01 | 2.3367E−02 | −2.8178E−03 | 2.1470E−02 | −3.5467E−03 |
| R7 | 1.5755E−01 | −2.1002E−01 | 6.8239E−02 | 5.9684E−03 | −8.1117E−03 | 1.2773E−03 |
| R8 | −6.4516E+00 | −1.2416E−01 | 5.1364E−02 | −1.6675E−02 | 3.4708E−03 | −3.3846E−04 |

Figure 34:
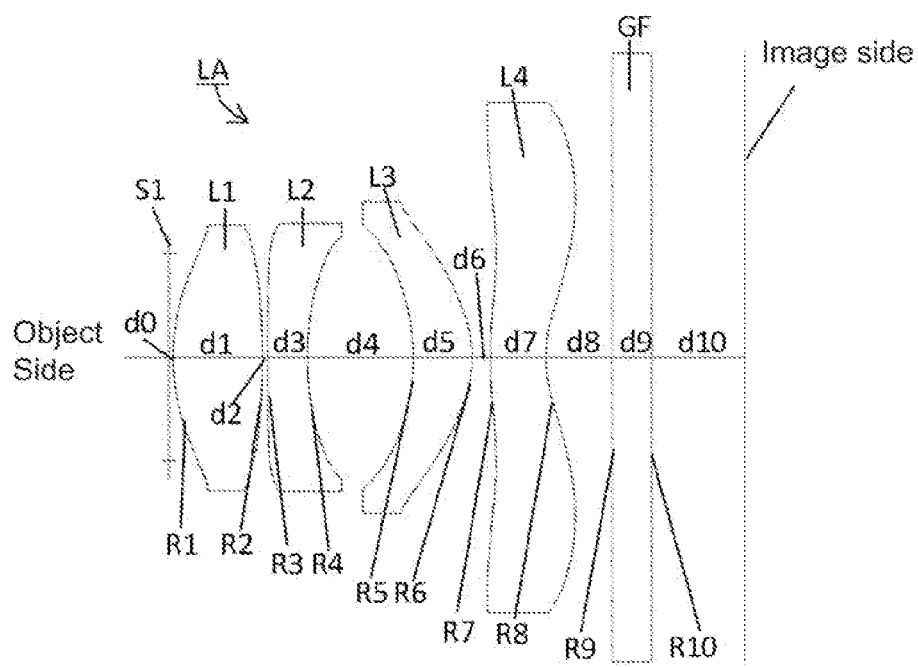
FIG. 34 is a schematic view of the imaging lens according to a ninth embodiment.
Figure 35:
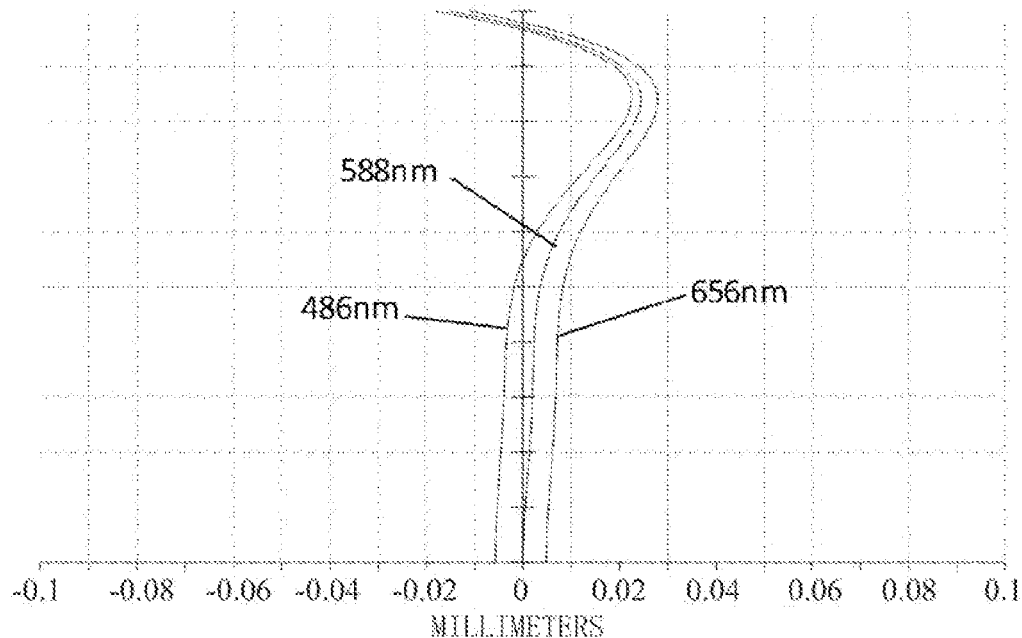
FIGS. 35~36, 37A, 37B are graphs respectively showing spherical aberration, lateral color aberration, astigmatism and distortion of FIG. 33.
Figure 36:
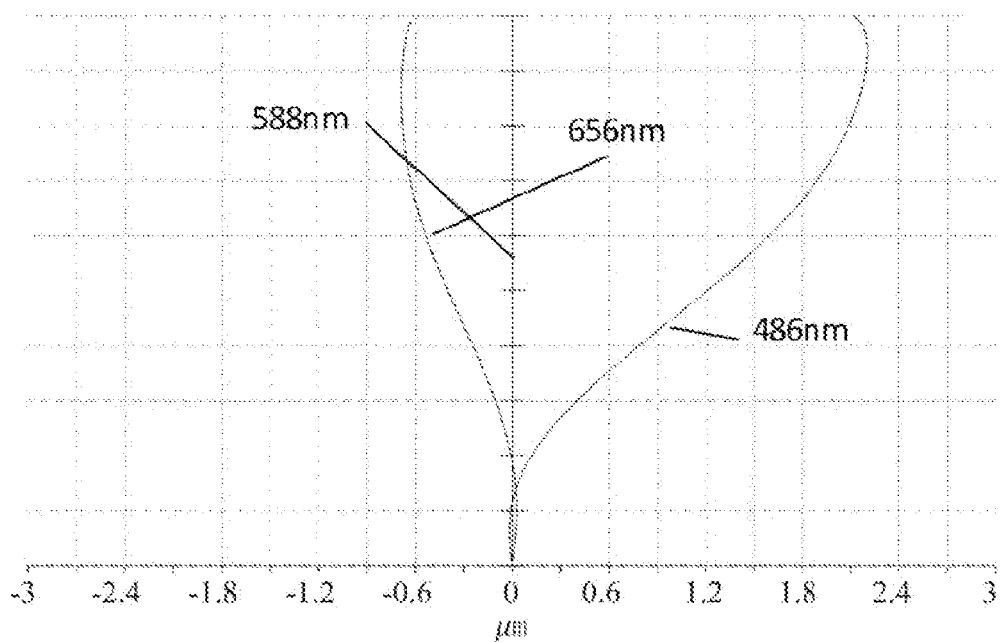
Figure 37A:
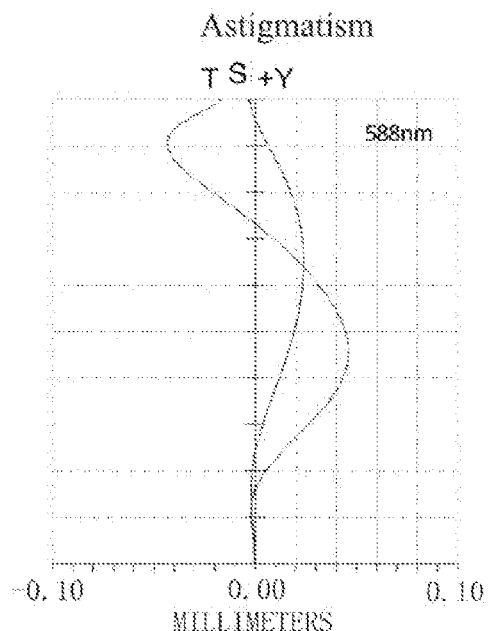
Figure 37B:
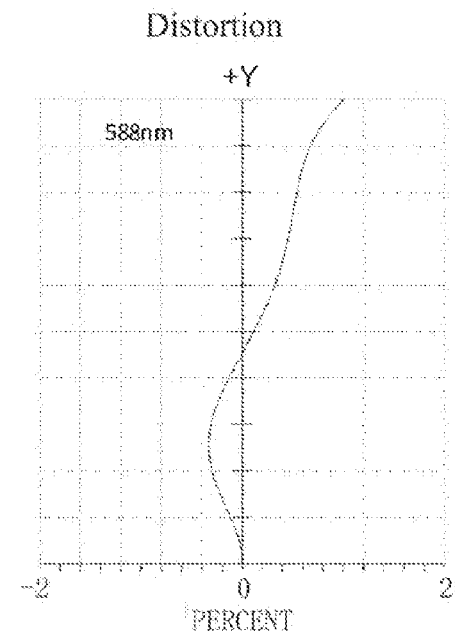

Referring to FIG. 34, an imaging lens LA according to a ninth embodiment is shown. FIGS. 35~36, 37A, 37B, are graphs of aberrations (spherical aberration, lateral color aberration, astigmatism, and distortion) of the ninth specification of the exemplary embodiment of the imaging lens LA. In FIGS. 35 and 36, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the ninth specification of the exemplary embodiment is from −0.1 mm to 0.1 mm, the lateral color aberration of the ninth specification of the exemplary embodiment is from −2 mm to 2 mm. As illustrated in FIG. 37A, the astigmatism is shown at the d light (wavelength: 588 nm) for both the sagittal image surface S and the tangential image surface T. The astigmatism of the ninth specification of the exemplary embodiment of the imaging lens LA is from −0.10 mm to 0.10 mm. In FIG. 37B, the distortion of the ninth specification of the exemplary embodiment of the imaging lens LA is from −2% to 2%.

In the ninth specification, not only the overall length of the imaging lens LA is reduced and the brightness is ensured (seen in Table 25, 2ω=60.5°, TTL=4.350 mm, FNo=2.5), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 19-20 show a tenth specification of the ninth embodiment of the imaging lens LA.

TABLE 19

| | R | d | | nd | | vd |
|---|---|---|---|---|---|---|
| S1 | ∞ | d0 = | 0.000 | | | |
| R1 | 1.605 | d1 = | 0.591 | n1 | 1.544 | v1 | 56.1 |
| R2 | −6.488 | d2 = | 0.059 | | | |
| R3 | 32.195 | d3 = | 0.328 | n2 | 1.640 | v2 | 23.4 |
| R4 | 2.382 | d4 = | 0.766 | | | |
| R5 | −2.324 | d5 = | 0.708 | n3 | 1.544 | v3 | 56.1 |
| R6 | −0.831 | d6 = | 0.092 | | | |
| R7 | 3.935 | d7 = | 0.405 | n4 | 1.544 | v4 | 56.1 |
| R8 | 0.853 | d8 = | 0.500 | | | |
| R9 | ∞ | d9 = | 0.300 | n5 | 1.517 | v5 | 64.17 |
| R10 | ∞ | d10 = | 0.637 | | | |

TABLE 20

| | conic constant | aspheric constant | | | | |
|---|---|---|---|---|---|---|
| | k | A4 | A6 | A8 | A10 | A12 |
| R1 | −1.0152E+00 | −2.0664E−03 | 1.0595E−02 | −3.7729E−02 | −4.4990E−02 | 0.0000E+00 |
| R2 | −2.0958E+02 | −4.5852E−02 | −1.3148E−01 | 1.7762E−01 | −7.9581E−02 | 0.0000E+00 |
| R3 | 0.0000E+00 | 8.4766E−02 | −3.1854E−01 | 5.0493E−01 | −1.8427E−01 | 0.0000E+00 |
| R4 | 4.7693E+00 | 2.9417E−02 | −1.1800E−01 | 1.6274E−01 | −6.1790E−02 | 0.0000E+00 |
| R5 | −1.2324E+00 | 2.4613E−02 | −1.2733E−01 | 1.1343E−01 | −7.2319E−02 | 2.7387E−02 |
| R6 | −3.9290E+00 | −1.2841E−01 | 2.9907E−02 | −4.2303E−03 | 1.9925E−02 | −5.4126E−03 |
| R7 | 7.0111E−01 | −2.0809E−01 | 6.7684E−02 | 6.0232E−03 | −8.0707E−03 | 1.2528E−03 |
| R8 | −6.4745E+00 | −1.2755E−01 | 5.1535E−02 | −1.6822E−02 | 3.4309E−03 | −3.3817E−04 |

Figure 38:
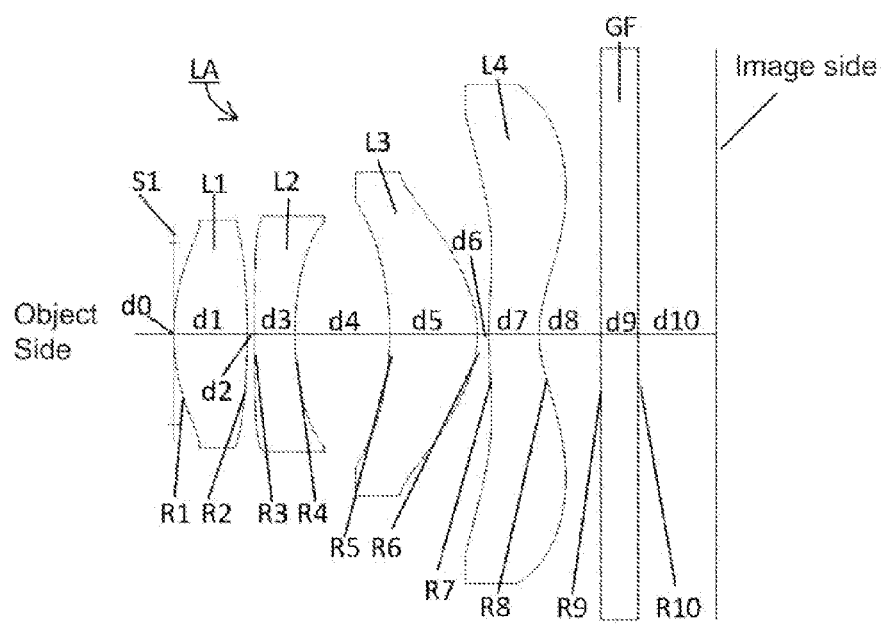
FIG. 38 is a schematic view of the imaging lens according to a tenth embodiment.
Figure 39:
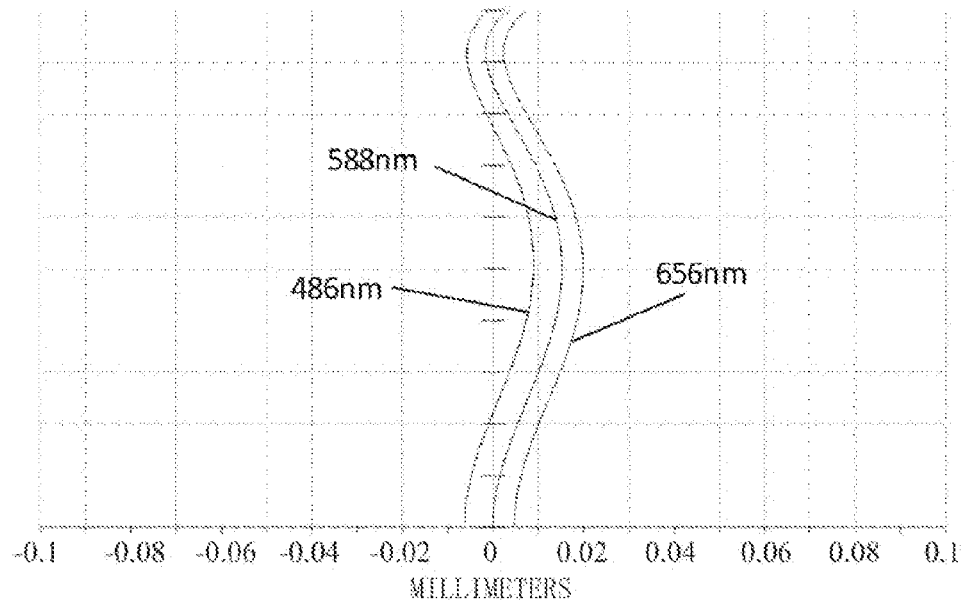
FIGS. 39~40, 41A, 41B are graphs respectively showing spherical aberration, lateral color aberration, astigmatism and distortion of FIG. 37.
Figure 40:
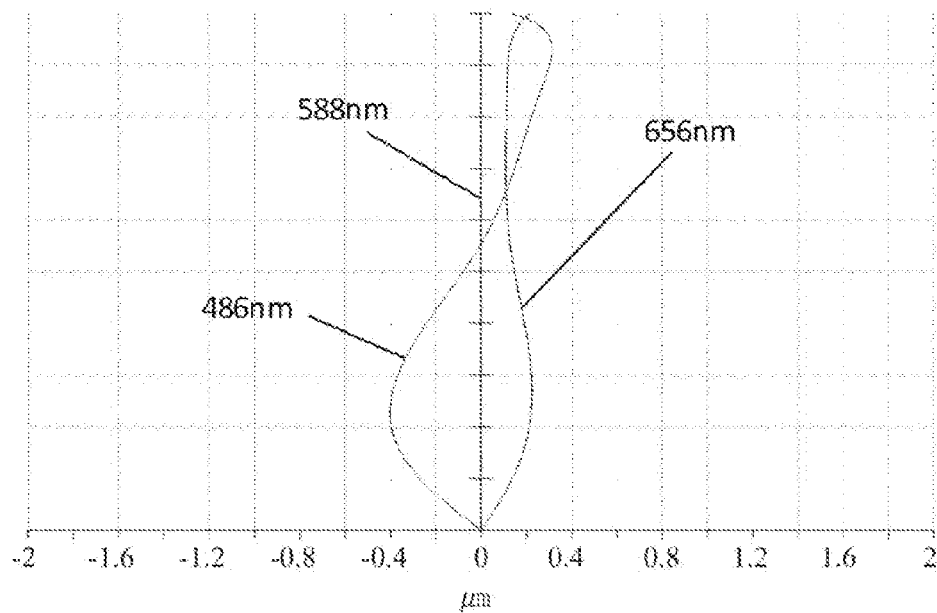
Figure 41A:
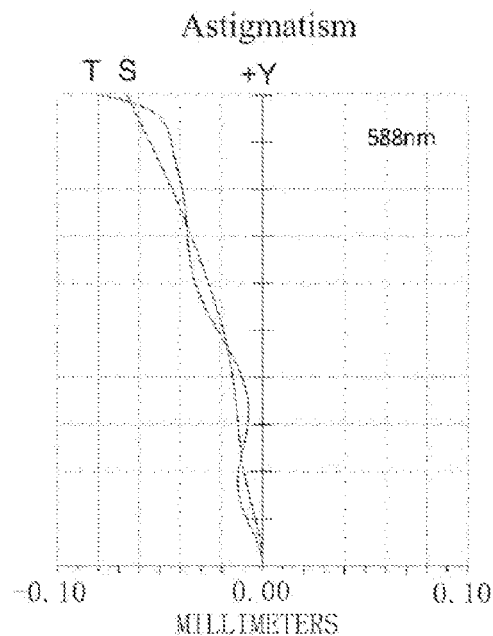
Figure 41B:
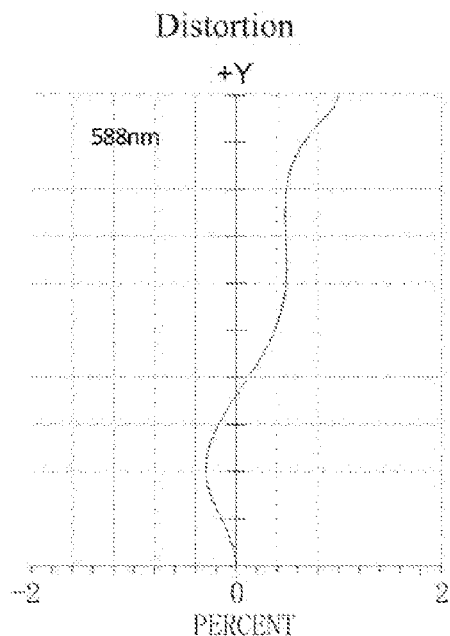

Referring to FIG. 38, an imaging lens LA according to a tenth embodiment is shown. FIGS. 39~40, 41A, 41B, are graphs of aberrations (spherical aberration, lateral color aberration, astigmatism, and distortion) of the tenth specification of the exemplary embodiment of the imaging lens LA. In FIGS. 39 and 40, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the tenth specification of the exemplary embodiment is from −0.1 mm to 0.1 mm, the lateral color aberration of the tenth specification of the exemplary embodiment is from −2 mm to 2 mm. As illustrated in FIG. 41A, the astigmatism is shown at the d light (wavelength: 588 nm) for both the sagittal image surface S and the tangential image surface T. The astigmatism of the tenth specification of the exemplary embodiment of the imaging lens LA is from −0.15 mm to 0.15 mm. In FIG. 41B, the distortion of the tenth specification of the exemplary embodiment of the imaging lens LA is from −2% to 2%.

In the tenth specification, not only the overall length of the imaging lens LA is reduced and the brightness is ensured (seen in Table 25, 2ω=64.1°, TTL=4.386 mm, FNo=2.5), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 21-22 show an eleventh specification of the eleventh embodiment of the imaging lens LA.

TABLE 21

|  | R | d |  | nd |  | vd |
|---|---|---|---|---|---|---|
| S1 | ∞ | d0 = 0.000 |  |  |  |  |
| R1 | 1.592 | d1 = 0.564 | n1 | 1.544 | v1 | 56.1 |
| R2 | −5.762 | d2 = 0.053 |  |  |  |  |
| R3 | 42.135 | d3 = 0.316 | n2 | 1.640 | v2 | 23.4 |
| R4 | 2.374 | d4 = 0.767 |  |  |  |  |
| R5 | −2.179 | d5 = 0.492 | n3 | 1.544 | v3 | 56.1 |
| R6 | −0.907 | d6 = 0.110 |  |  |  |  |
| R7 | 2.701 | d7 = 0.441 | n4 | 1.544 | v4 | 56.1 |
| R8 | 0.889 | d8 = 0.500 |  |  |  |  |
| R9 | ∞ | d9 = 0.300 | n5 | 1.517 | v5 | 64.17 |
| R10 | ∞ | d10 = 0.530 |  |  |  |  |

TABLE 22

|  | conic constant | aspheric constant | | | | |
|---|---|---|---|---|---|---|
|  | k | A4 | A6 | A8 | A10 | A12 |
| R1 | −6.3815E−01 | 9.4466E−03 | −7.3373E−03 | −4.9611E−02 | −2.8483E−02 | 0.0000E+00 |
| R2 | −1.7901E+02 | −1.2458E−02 | −9.2264E−02 | 7.2402E−02 | −1.4473E−01 | 0.0000E+00 |
| R3 | 0.0000E+00 | 9.1625E−02 | −2.7859E−01 | 4.4349E−01 | −2.8324E−01 | 0.0000E+00 |
| R4 | 3.6841E+00 | 1.0454E−02 | −1.5106E−01 | 2.9154E−01 | −1.6937E−01 | 0.0000E+00 |
| R5 | −6.7099E−01 | 1.8272E−02 | −1.2868E−01 | 1.1018E−01 | −7.8183E−02 | 2.2703E−02 |
| R6 | −4.1203E+00 | −1.2380E−01 | 3.3845E−02 | −1.7766E−03 | 2.1553E−02 | −3.7712E−03 |
| R7 | 4.2483E−01 | −2.0982E−01 | 6.7191E−02 | 5.8575E−03 | −8.1374E−03 | 1.2226E−03 |
| R8 | −5.7083E+00 | −1.2605E−01 | 5.1304E−02 | −1.6844E−02 | 3.4223E−03 | −3.4031E−04 |

Figure 42:
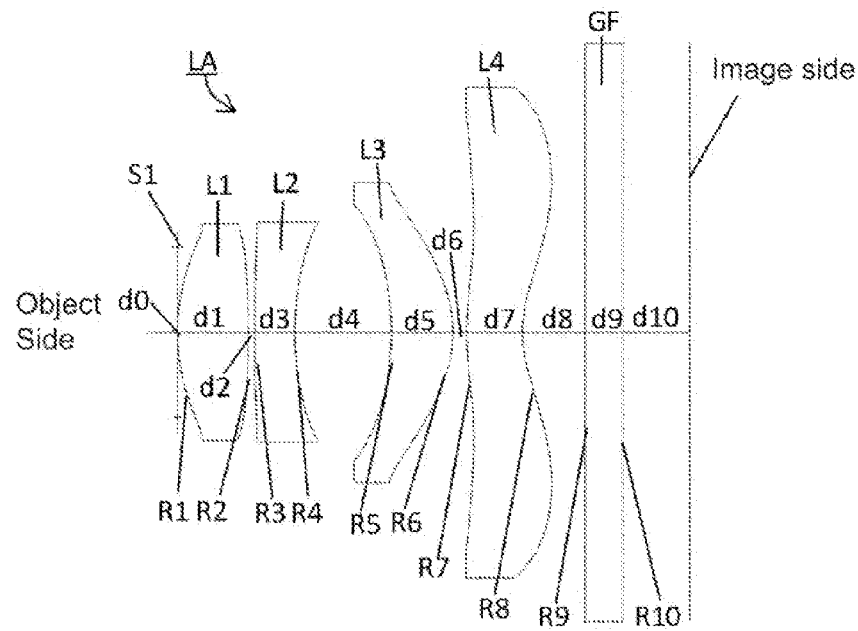
FIG. 42 is a schematic view of the imaging lens according to an eleventh embodiment.
Figure 43:
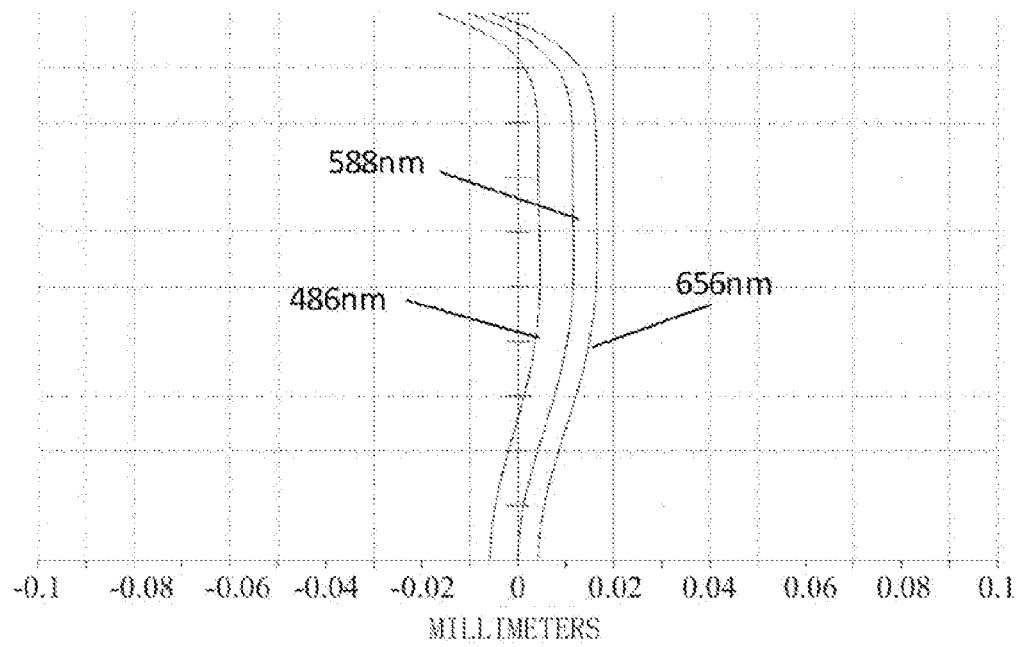
FIGS. 43~44, 45A, 45B are graphs respectively showing spherical aberration, lateral color aberration, astigmatism and distortion of FIG. 41.
Figure 44:
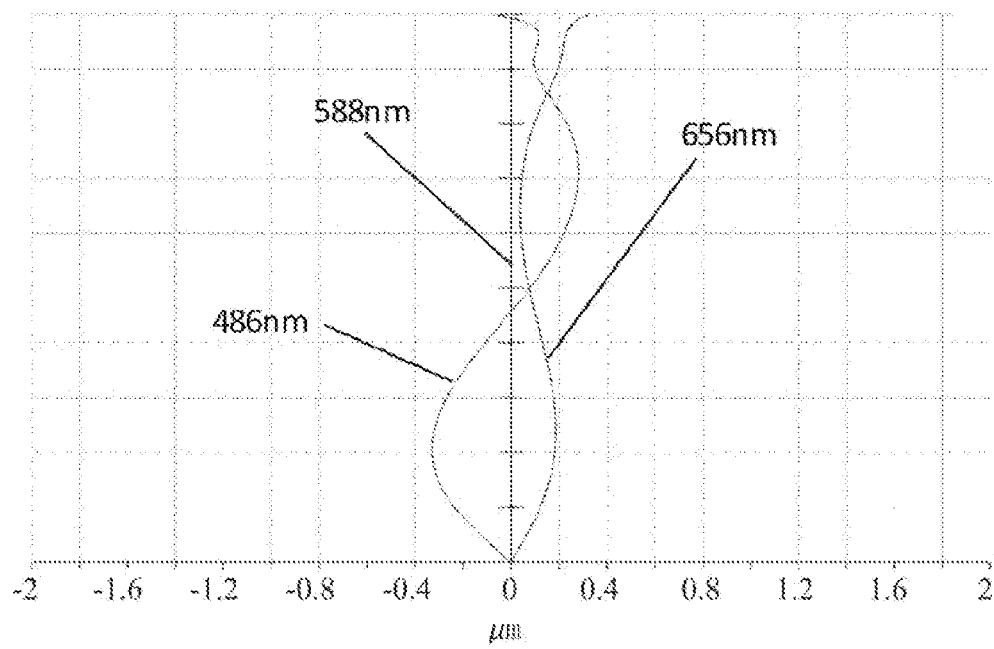
Figure 45A:
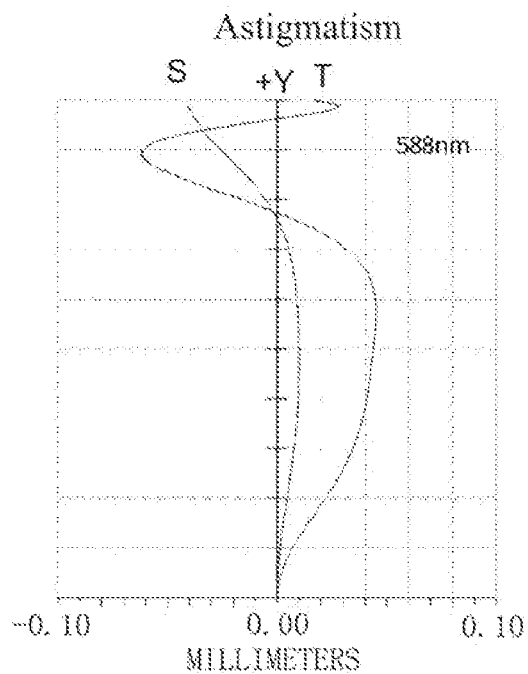
Figure 45B:
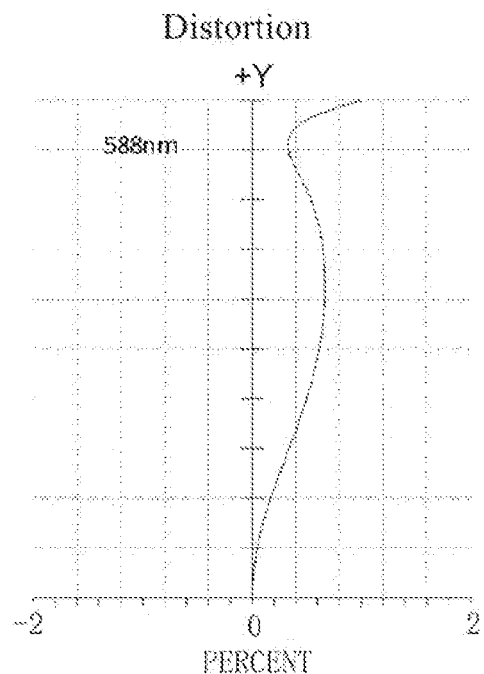

Referring to FIG. 42, an imaging lens LA according to an eleventh embodiment is shown. FIGS. 43~44, 45A, 45B, are graphs of aberrations (spherical aberration, lateral color aberration, astigmatism, and distortion) of the eleventh specification of the exemplary embodiment of the imaging lens LA. In FIGS. 43 and 44, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the eleventh specification of the exemplary embodiment is from −0.1 mm to 0.1 mm, the lateral color aberration of the first specification of the exemplary embodiment is from −2 mm to 2 mm. As illustrated in FIG. 45A, the astigmatism is shown at the d light (wavelength: 588 nm) for both the sagittal image surface S and the tangential image surface T. The astigmatism of the eleventh specification of the exemplary embodiment of the imaging lens LA is from −0.10 mm to 0.10 mm. In FIG. 45B, the distortion of the eleventh specification of the exemplary embodiment of the imaging lens LA is from −2% to 2%.

In the eleventh specification, not only the overall length of the imaging lens LA is reduced and the brightness is ensured (seen in Table 25, 2ω=68°, TTL=4.073 mm, FNo=2.5), but also aberrations of the imaging lens LA are favorably corrected. That is, the imaging lens LA keeps lateral color aberration at a minimum while maintaining the field angle in 60°~70° range, and reducing the total length of the imaging lens LA.

Tables 23-24 show an twelfth specification of the twelfth embodiment of the imaging lens LA.

TABLE 23

|  | R | d |  | nd |  | vd |
|---|---|---|---|---|---|---|
| S1 | ∞ | d0 = 0.000 |  |  |  |  |
| R1 | 1.648 | d1 = 0.583 | n1 | 1.544 | v1 | 56.1 |
| R2 | −6.507 | d2 = 0.030 |  |  |  |  |
| R3 | 20.210 | d3 = 0.300 | n2 | 1.640 | v2 | 23.4 |

TABLE 23-continued

|  | R | d |  | nd |  | vd |
|---|---|---|---|---|---|---|
| R4 | 2.526 | d4 = 0.870 |  |  |  |  |
| R5 | −2.240 | d5 = 0.597 | n3 | 1.544 | v3 | 56.1 |
| R6 | −0.844 | d6 = 0.088 |  |  |  |  |
| R7 | 4.308 | d7 = 0.398 | n4 | 1.544 | v4 | 56.1 |
| R8 | 0.851 | d8 = 0.500 |  |  |  |  |
| R9 | ∞ | d9 = 0.300 | n5 | 1.517 | v5 | 64.17 |
| R10 | ∞ | d10 = 0.734 |  |  |  |  |

TABLE 24

|  | conic constant | aspheric constant | | | | |
|---|---|---|---|---|---|---|
|  | k | A4 | A6 | A8 | A10 | A12 |
| R1 | −9.7544E−01 | −1.3042E−03 | −9.8227E−03 | −4.0077E−02 | −1.9929E−02 | 0.0000E+00 |
| R2 | −2.0950E+02 | −3.3050E−02 | −1.3791E−01 | 1.7660E−01 | −6.8432E−02 | 0.0000E+00 |
| R3 | 3.1508E+02 | 8.8756E−02 | −3.0811E−03 | 5.0591E−01 | −1.9255E−01 | 0.0000E+00 |
| R4 | 5.0623E+00 | 2.1923E−02 | −1.1561E−01 | 1.4649E−01 | −3.6099E−02 | 0.0000E+00 |
| R5 | −4.5399E−01 | 1.6173E−02 | −1.2542E−01 | 1.0712E−01 | −6.1141E−02 | 1.6195E−02 |
| R6 | −4.0379E+00 | −1.2388E−01 | 3.2972E−02 | −3.6453E−03 | 2.1179E−02 | −4.5416E−03 |
| R7 | −1.3578E−01 | −2.0780E−01 | 6.7717E−02 | 6.1746E−03 | −7.9948E−03 | 1.2855E−03 |
| R8 | −6.2513E+00 | −1.2672E−01 | 5.1567E−02 | −1.6889E−02 | 3.3996E−03 | −3.2307E−04 |

Figure 46:
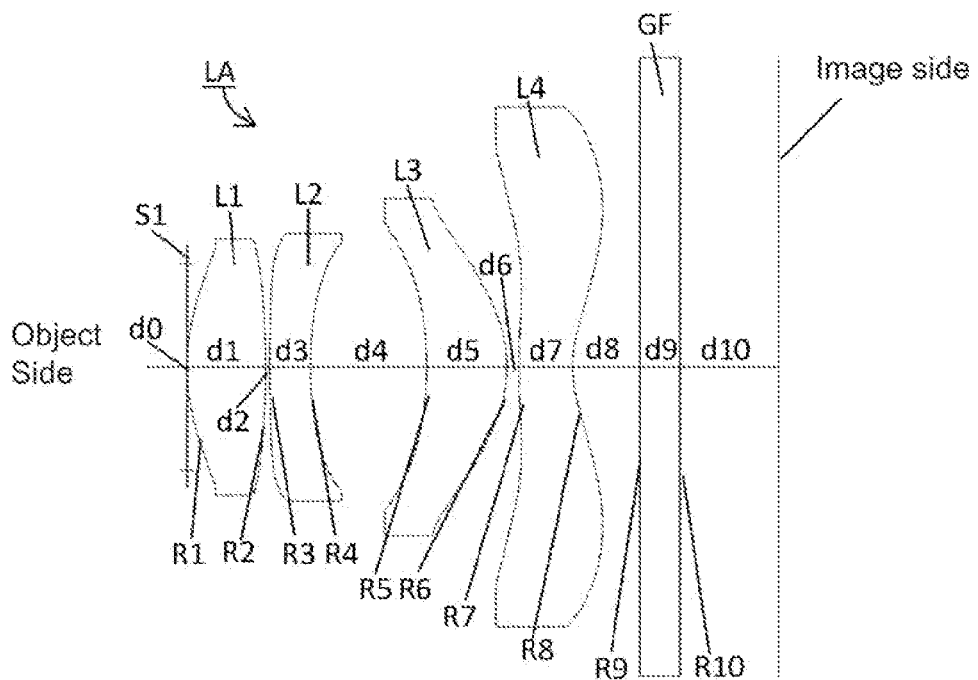
FIG. 46 is a schematic view of the imaging lens according to a twelfth embodiment.
Figure 47:
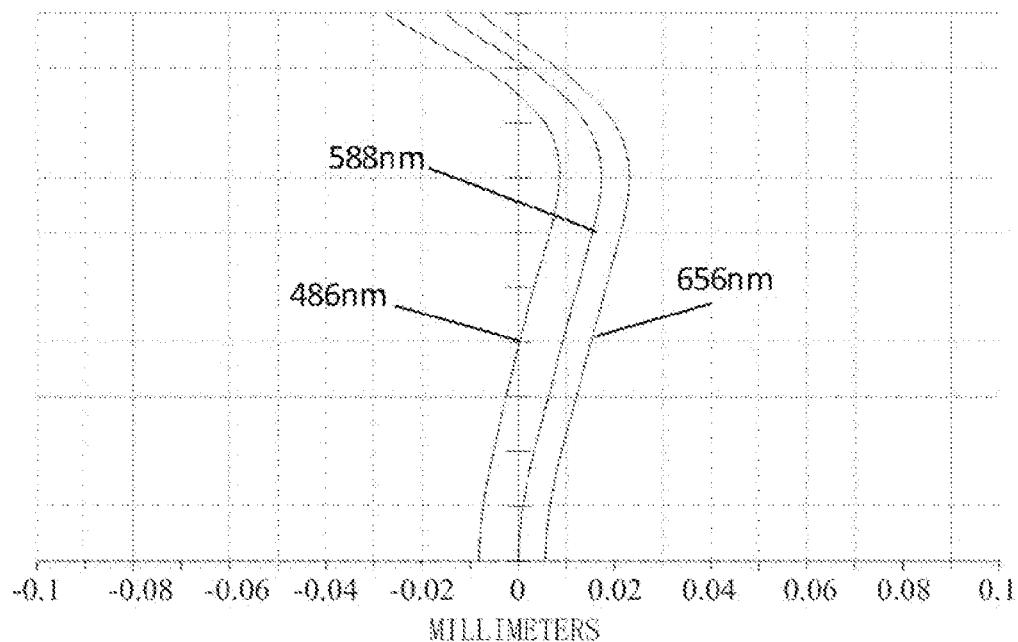
FIGS. 47~48, 49A, 49B are graphs respectively showing spherical aberration, lateral color aberration, astigmatism and distortion of FIG. 45.
Figure 48:
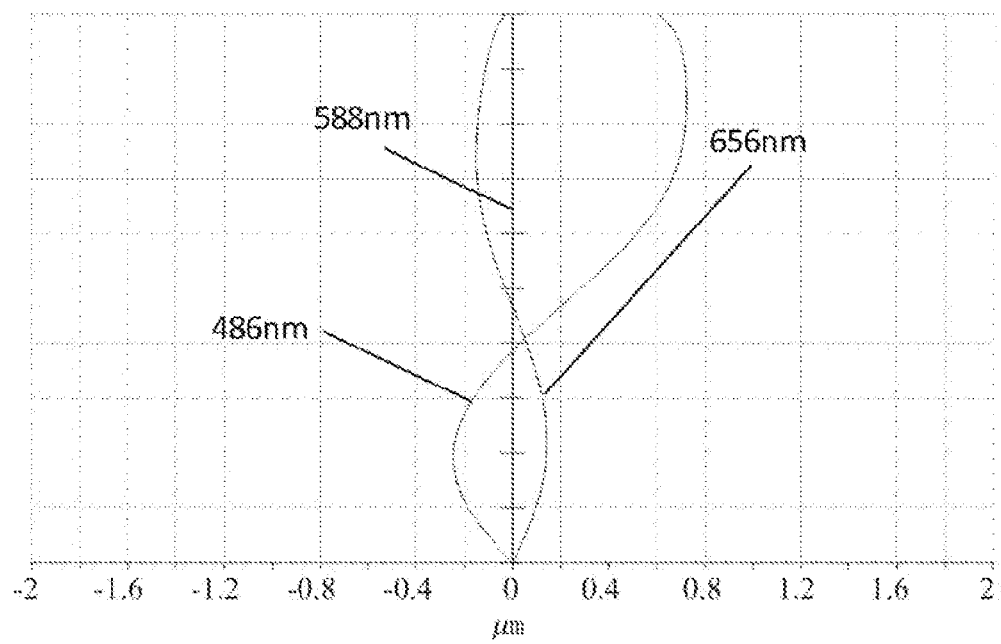
Figure 49A:
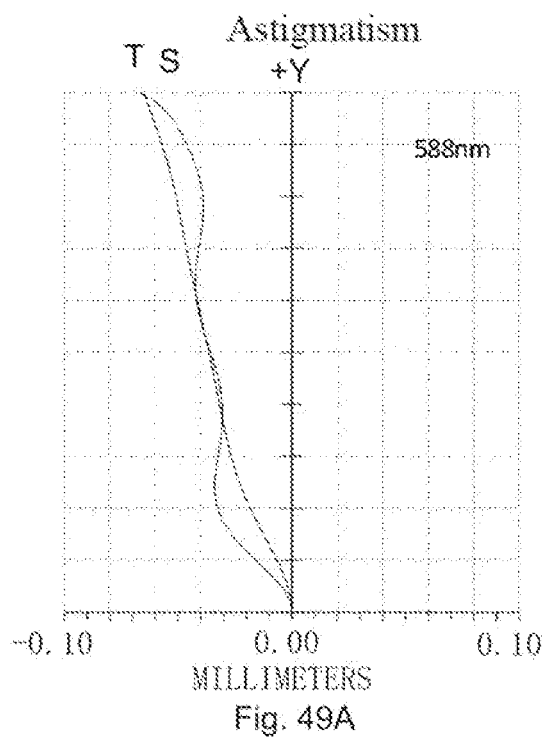
Figure 49B:
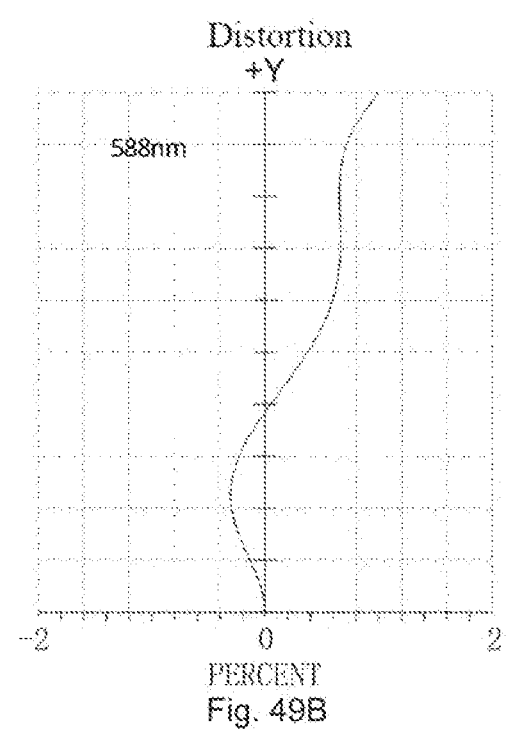

Referring to FIG. 46, an imaging lens LA according to a twelfth embodiment is shown. FIGS. 47~48, 49A, 49B, are graphs of aberrations (spherical aberration, lateral color aberration, astigmatism, and distortion) of the twelfth specification of the exemplary embodiment of the imaging lens LA. In FIGS. 47 and 48, curves are spherical aberration and lateral color aberration characteristic curves of F light (wavelength: 486.1 nm), d light (wavelength: 587.6 nm) and C light (wavelength: 656.3 nm) of the imaging lens LA. The spherical aberration of the twelfth specification of the exemplary embodiment is from −0.1 mm to 0.1 mm, the lateral color aberration of the twelfth specification of the exemplary embodiment is from −2 mm to 2 mm. As illustrated in FIG. 49A, the astigmatism is shown at the d light (wavelength: 588 nm) for both the sagittal image surface S and the tangential image surface T. The astigmatism of the twelfth specification of the exemplary embodiment of the imaging lens LA is from −0.10 mm to 0.10 mm. In FIG. 49B, the distortion of the twelfth specification of the exemplary embodiment of the imaging lens LA is from −2% to 2%.

In the twelfth specification, not only the overall length of the imaging lens LA is reduced and the brightness is ensured (seen in Table 25, 2ω=61.4°, TTL=4.400 mm, FNo=2.5), but also aberrations of the imaging lens LA are favorably corrected. That is, the imaging lens LA keeps lateral color aberration at a minimum while maintaining the field angle in 60°~70° range, and reducing the total length of the imaging lens LA.

Table 25 shows every specification of the above embodiments, every numerical value is met with the conditions (1)~(9) shown above.

TABLE 25

|  | embodiment 1 | embodiment 2 | embodiment 3 | embodiment 4 | embodiment 5 | embodiment 6 | embodiment 7 | embodiment 8 | embodiment 9 | embodiment 10 | embodiment 11 | embodiment 12 | remark |
|---|---|---|---|---|---|---|---|---|---|---|---|---|---|
| f1/f | 0.695 | 0.653 | 0.680 | 0.672 | 0.735 | 0.684 | 0.679 | 0.705 | 0.607 | 0.676 | 0.708 | 0.656 | formula(1) |
| f/d1 | 6.038 | 6.353 | 5.400 | 6.799 | 5.513 | 5.993 | 6.096 | 6.093 | 5.717 | 6.071 | 5.902 | 6.489 | formula(2) |
| f/d6 | 37.914 | 43.800 | 35.838 | 41.101 | 12.198 | 35.923 | 33.283 | 42.000 | 27.719 | 39.000 | 30.264 | 42.989 | formula(3) |
| R1/R2 | −0.240 | −0.246 | −0.275 | −0.243 | −0.269 | −0.335 | −0.240 | −0.256 | −0.256 | −0.247 | −0.276 | −0.253 | formula(4) |
| R3/R4 | 14.678 | 16.130 | 18.000 | 16.049 | 18.500 | 16.566 | 3.100 | 11.000 | 17.000 | 13.515 | 17.748 | 8.000 | formula(5) |
| R5/R6 | 2.733 | 2.692 | 2.731 | 2.725 | 2.655 | 2.721 | 2.556 | 2.951 | 1.900 | 2.796 | 2.402 | 2.643 | formula(6) |
| f2/f | −1.131 | −1.062 | −1.100 | −1.075 | −1.192 | −1.117 | −1.250 | −1.200 | −0.990 | −1.125 | −1.184 | −1.200 | formula(7) |
| f3/f | 0.609 | 0.583 | 0.604 | 0.588 | 0.665 | 0.605 | 0.598 | 0.599 | 0.699 | 0.568 | 0.755 | 0.575 | formula(8) |
| f4/f | −0.645 | −0.583 | −0.618 | −0.616 | −0.646 | −0.639 | −0.553 | −0.628 | −0.624 | −0.585 | −0.800 | −0.537 | formula(9) |
| Fno | 2.40 | 2.40 | 2.40 | 2.45 | 2.40 | 2.40 | 2.50 | 2.40 | 2.50 | 2.50 | 2.50 | 2.50 |  |
| 2w | 65.0 | 62.2 | 64.7 | 63.1 | 69.2 | 64.9 | 62.5 | 65.0 | 60.5 | 64.1 | 68.0 | 61.4 |  |
| f | 3.526 | 3.723 | 3.548 | 3.658 | 3.269 | 3.530 | 3.761 | 3.528 | 3.853 | 3.588 | 3.329 | 3.783 |  |
| f1 | 2.450 | 2.430 | 2.413 | 2.460 | 2.403 | 2.415 | 2.554 | 2.486 | 2.340 | 2.427 | 2.356 | 2.480 |  |
| f2 | −3.988 | −3.955 | −3.902 | −3.934 | −3.897 | −3.944 | −4.701 | −4.234 | −3.815 | −4.037 | −3.943 | −4.541 |  |
| f3 | 2.146 | 2.170 | 2.143 | 2.152 | 2.174 | 2.136 | 2.248 | 2.112 | 2.695 | 2.038 | 2.514 | 2.177 |  |
| f4 | −2.273 | −2.171 | −2.193 | −2.253 | −2.111 | −2.257 | −2.080 | −2.215 | −2.404 | −2.099 | −2.663 | −2.032 |  |
| TTL | 4.301 | 4.380 | 4.308 | 4.380 | 4.034 | 4.337 | 4.350 | 4.315 | 4.350 | 4.386 | 4.073 | 4.400 |  |
| LB | 1.441 | 1.545 | 1.206 | 1.567 | 1.200 | 1.448 | 1.413 | 1.441 | 1.413 | 1.437 | 1.330 | 1.534 |  |
| IH | 2.268 | 2.268 | 2.268 | 2.268 | 2.268 | 2.268 | 2.268 | 2.268 | 2.268 | 2.268 | 2.268 | 2.268 |  |

While certain embodiments have been described and exemplified above, various other embodiments will be apparent to those skilled in the art from the foregoing disclosure. The disclosure is not limited to the particular embodiments described and exemplified, and the embodiments are capable of considerable variation and modification without departure from the scope of the appended claims.

What is claimed is:

1. An imaging lens, in the order from the object-side to the image-side of the imaging lens, comprising:

a first lens of positive refraction power, with two convex surfaces along the optical axis of the imaging lens;

a second lens of negative refraction power, with a convex surface on the object-side and having a meniscus shape;

a third lens of positive refraction power, with a convex surface on the image-side and having a meniscus shape;

a fourth lens of negative refraction power, with a convex surface on the object-side and having a meniscus shape;

wherein the imaging lens satisfies the following conditions:

$0.50 \leq f1/f \leq 0.75$; $5.20 \leq f/d1 \leq 8.00$; $12.00 \leq f/d6 \leq 45.00$; $-0.35 \leq R1/R2 \leq -0.20$; and $3.00 \leq R3/R4 \leq 20.00$;

Wherein: f is a focal length of the imaging lens; f1 is a focal length of the first lens; d1 is a center thickness of the first lens on the optical axis of the imaging lens; d6 is a distance between the image-side surface of the third lens and the object-side surface of the fourth lens on the optical axis of imaging lens; R1 is a radius of curvature of the object-side surface of the first lens; R2 is a radius of curvature of the image-side surface of the first lens; R3 is a radius of curvature of the object-side surface of the second lens; R4 is a radius of curvature of the image-side surface of the second lens.

2. The imaging lens of claim 1, further comprising an aperture stop, wherein the aperture stop is installed on the object-side surface of the first lens.

3. The lens system of claim 1, wherein following condition is satisfied: $1.00 \leq R5/R6 \leq 3.00$; wherein R5 is a radius of curvature of the object-side surface of the third lens; R6 is a radius of curvature of the image-side surface of the third lens.

4. The lens system of claim 1, wherein t following condition is satisfied: $-1.30 \leq f2/f \leq -0.95$; wherein f is a focal length of the imaging lens; f2 is a focal length of the second lens.

5. The lens system of claim 1, wherein the following condition is satisfied: $0.55 \leq f3/f \leq 0.80$; wherein f is a focal length of the imaging lens; f2 is a focal length of the third lens.

6. The lens system of claim 1, wherein the following condition is satisfied: $-1.00 \leq f4/f \leq -0.50$; wherein f is a focal length of the imaging lens; f4 is a focal length of the fourth lens.

* * * * *